United States Patent
Seregin et al.

(10) Patent No.: US 9,912,951 B2
(45) Date of Patent: *Mar. 6, 2018

(54) VIDEO-ENCODING METHOD AND APPARATUS FOR SAME AND VIDEO-DECODING METHOD AND APPARATUS FOR SAME USING A SELECTIVE SCAN MODE

(71) Applicant: SAMSUNG ELECTRONICS CO., LTD., Suwon-si (KR)

(72) Inventors: Vadim Seregin, Suwon-si (KR); Jianle Chen, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/212,649

(22) Filed: Jul. 18, 2016

(65) Prior Publication Data

US 2016/0330448 A1 Nov. 10, 2016

Related U.S. Application Data

(63) Continuation of application No. 13/979,795, filed as application No. PCT/KR2012/000321 on Jan. 13, 2012, now Pat. No. 9,414,056.

(Continued)

(51) Int. Cl.
*H04N 7/12* (2006.01)
*H04N 19/129* (2014.01)
(Continued)

(52) U.S. Cl.
CPC ......... *H04N 19/129* (2014.11); *H04N 19/136* (2014.11); *H04N 19/18* (2014.11);
(Continued)

(58) Field of Classification Search
CPC .... H04N 19/129; H04N 19/136; H04N 19/18; H04N 19/625; H04N 19/186; H04N 19/96; H04N 19/60
(Continued)

(56) References Cited

U.S. PATENT DOCUMENTS 6,148,109 A * 11/2000 Boon ................... H04N 19/619
375/E7.133
6,931,067 B2 8/2005 Jang
(Continued)

FOREIGN PATENT DOCUMENTS

JP 2003-219421 A 7/2003
JP 2004-253826 A 9/2004
(Continued)

OTHER PUBLICATIONS

Communication dated Nov. 25, 2016 issued by the Korean Intellectual Property Office in counterpart Korean Patent Application No. 10-2012-0004518.
(Continued)

*Primary Examiner* — Allen Wong
(74) *Attorney, Agent, or Firm* — Sughrue Mion, PLLC

(57) ABSTRACT

Provided are encoding and decoding methods and apparatuses for a video by selectively determining and using a scan mode. The video encoding method includes: generating transformation coefficients by performing transformation based on a transformation unit to encode an image; determining a scan mode, from among a plurality of scan modes, indicating a scanning direction of the generated transformation coefficients, based on characteristics of the transformation coefficients; and determining and outputting an encoding order of the generated transformation coefficients based on the scanning direction of the determined scan mode.

2 Claims, 16 Drawing Sheets

Related U.S. Application Data

(60) Provisional application No. 61/432,311, filed on Jan. 13, 2011.

(51) Int. Cl.
*H04N 19/60* (2014.01)
*H04N 19/96* (2014.01)
*H04N 19/136* (2014.01)
*H04N 19/18* (2014.01)
*H04N 19/186* (2014.01)
*H04N 19/625* (2014.01)

(52) U.S. Cl.
CPC .......... *H04N 19/186* (2014.11); *H04N 19/60* (2014.11); *H04N 19/625* (2014.11); *H04N 19/96* (2014.11)

(58) Field of Classification Search
USPC .................................................. 375/240.02
See application file for complete search history.

(56) References Cited

U.S. PATENT DOCUMENTS

| 2001/0007576 | A1 | 7/2001 | Lyu |
| 2002/0041632 | A1* | 4/2002 | Sato ................... H04N 19/105 375/240.25 |
| 2002/0131497 | A1 | 9/2002 | Jang |
| 2004/0028141 | A1 | 2/2004 | Hsiun et al. |
| 2005/0100231 | A1 | 5/2005 | Wang et al. |
| 2007/0065028 | A1 | 3/2007 | Boon et al. |
| 2015/0296223 | A1 | 10/2015 | Seo et al. |

FOREIGN PATENT DOCUMENTS

| KR | 1996-0006595 A | 2/1996 |
| KR | 2002-0065766 A | 8/2002 |
| KR | 10-0403077 B1 | 10/2003 |
| KR | 10-2008-0099835 A | 11/2008 |

OTHER PUBLICATIONS

International Search Report dated Sep. 25, 2012 issued in International Application No. PCT/KR2012/00321 (PCT/ISA/210).
Written Opinion dated Sep. 25, 2012 issued in International Application No. PCT/KR2012/00321 (PCT/ISA/237).
Thomas Wiegand, et al., "Text of ISO/IEC FDIS 14496-10: Information Technology—Coding of audio-visual objects—Part 10: Advanced Video Coding", International Organisation for Standardisation Organisation Internationale De Normalisation ISO/IEC JTC 1/SC 29/WG 11 Coding of Moving Pictures and Audio, N5555, ISO/IEC FDIS 14496-10:2003(E), Mar. 31, 2003, total 273 pages.
Communication dated Feb. 20, 2017, issued by the Korean Intellectual Property Office in counterpart Korean application No. 10-2016-0111686.
Communication dated Feb. 20, 2017, issued by the Korean Intellectual Property Office in counterpart Korean application No. 10-2016-0111687.
Communication dated Feb. 20, 2017, issued by the Korean Intellectual Property Office in counterpart Korean application No. 10-2016-0111688.
Communication dated Feb. 20, 2017, issued by the Korean Intellectual Property Office in counterpart Korean application No. 10-2016-0111689.

* cited by examiner

FIG. 1
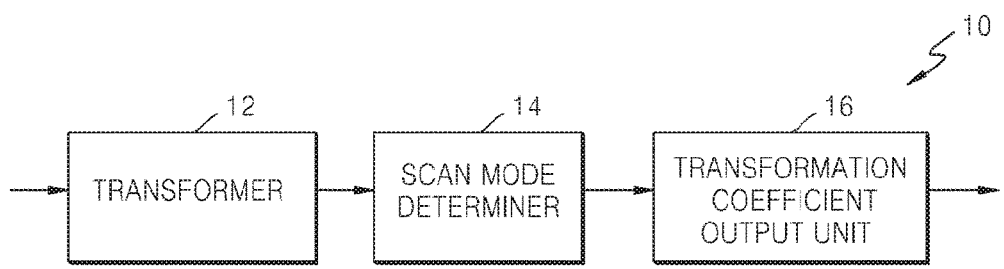
FIG. 2
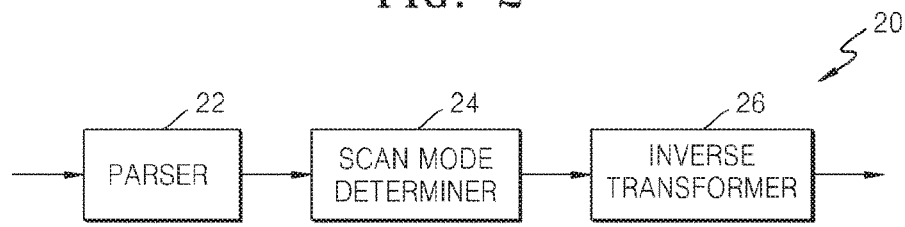
FIG. 3

| Scan order | Overhead bits |
|---|---|
| Zigzag scan | 0 |
| Horizontal scan | 10 |
| Vertical scan | 11 |

CODING UNIT (1010)

PREDICTION UNIT (1060)

VIDEO-ENCODING METHOD AND APPARATUS FOR SAME AND VIDEO-DECODING METHOD AND APPARATUS FOR SAME USING A SELECTIVE SCAN MODE

CROSS-REFERENCE TO RELATED APPLICATIONS

This application is a continuation application of U.S. patent application Ser. No. 13/979,795, filed on Jul. 15, 2013, which is a National Stage application under 35 U.S.C. § 371 of International Application No. PCT/KR2012/000321, filed on Jan. 13, 2012, and claims the benefit of U.S. Provisional Application No. 61/432,311, filed on Jan. 13, 2011 in the United States Patent and Trademark Office, the disclosures of which are incorporated herein by reference in their entireties.

BACKGROUND

1. Field

Apparatuses and methods consistent with exemplary embodiments relate to encoding and decoding a video accompanied by transformation and inverse transformation.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

Image data in a spatial domain is converted into coefficients in a frequency domain by using frequency transformation. In a video codec, an image is split into blocks having a predetermined size and discrete cosine transform (DCT) is performed on each block to encode frequency coefficients in a block unit so as to quickly perform frequency transformation. The coefficients in the frequency domain are easily compressed compared to the image data in the spatial domain. In particular, since an image pixel value in the spatial domain is expressed in a prediction error via inter prediction or intra prediction of the video codec, a large amount of data may be converted to 0 when frequency transformation is performed on the prediction error. The video codec replaces data that continuously and repeatedly occurs by data having a small size, thereby reducing an amount of data.

SUMMARY

Aspects of one or more exemplary embodiments provide a method and apparatus for encoding a video, and a method and apparatus for decoding a video, which selectively determine and use a scan mode.

According to an aspect of an exemplary embodiment, there is provided a video encoding method including: generating transformation coefficients by performing transformation based on a transformation unit to encode an image; determining a scan mode, from among a plurality of scan modes, indicating a scanning direction of the generated transformation coefficients, based on characteristics of the generated transformation coefficients; and determining and outputting an encoding order of the generated transformation coefficients based on the scanning direction of the determined scan mode.

According to aspects of one or more exemplary embodiments, encoding order and a scanning direction of transformation coefficients are determined based on image characteristics to reduce a length of a significant map, according to video encoding and decoding methods.

According to an aspect of another exemplary embodiment, there is provided a video decoding method including: parsing, from a bitstream of a received video, transformation coefficients encoded based on a transformation unit; determining a scan mode, from among a plurality of scan modes, of the transformation unit, based on characteristics of the parsed transformation coefficients; and inverse transforming the transformation unit in which the transformation coefficients are arranged according to a scanning direction indicated by the determined scan mode.

The determining the scan mode may include determining one scan mode from among a zigzag scan mode, a horizontal scan mode, and a vertical scan mode.

The determining the scan mode may include determining the scan mode when the transformation coefficients include a coefficient that is not a direct current (DC) coefficient.

The determining the scan mode may include determining the scan mode based on an encoding mode the transformation unit.

The determining the scan mode based on the encoding mode of the transformation unit may include determining the scan mode based on at least one of a prediction direction for intra prediction for encoding the transformation coefficients, a slice type for inter prediction, a partition type for inter prediction, an entropy encoding method, a size of a coding unit including the transformation unit, a secondary transformation method, a size of a prediction unit of the coding unit, and encoding modes of the transformation unit including the size of the transformation unit.

The encoding mode of the transformation unit may be an encoding mode of at least one of the transformation unit, a coding unit including the transformation unit, and a prediction unit of the coding unit.

The determining the scan mode may include determining the scan mode of the transformation unit according to color components.

The determining the scan mode of the transformation unit according to the color components may include determining a scan mode of a transformation unit of a second color component based on at least one of an encoding mode and a scan mode of a transformation unit of a first color component.

The determining the scan mode of the transformation unit according to the color components may include: determining an encoding mode of a transformation unit of a second color component based on at least one of an encoding mode and a scan mode of a transformation unit of a first color component; and determining a scan mode of the transformation unit of the second color component based on the determined encoding mode of the transformation unit of the second color component.

The determining the scan mode of the transformation unit according to the color components may include: when an intra prediction direction of a chroma component is determined to be an intra prediction direction of a luma component, determining a scan mode of a transformation unit of a chroma component according to a scan mode of a transformation unit of a luma component; and when an intra prediction direction of a luma component and an intra prediction direction of a chroma component are individually determined, determining a scan mode of a transformation unit of a chroma component to be one of a zigzag scan mode, a horizontal scan mode, and a vertical scan mode based on the intra prediction direction of the chroma component.

The video encoding method may further include encoding scan mode information indicating the determined scan mode.

The encoding of the scan mode information may include encoding the scan mode information with respect to some scan modes from among a plurality of selectable scan modes.

The video encoding method may further include: encoding scan mode information indicating the determined scan mode when the transformation coefficients include a coefficient that is not a direct current (DC) coefficient; encoding last bit information indicating whether a DC coefficient is a last coefficient in the transformation coefficients; and encoding the scan mode information when the DC coefficient is not the last coefficient.

The parsing may include parsing scan mode information of the transformation unit, and the determining of the scan mode may include determining a scan mode of the transformation unit based on the scan mode information.

The determining the scan mode may include, when the transformation coefficients include a coefficient that is not a DC coefficient, determining a scan mode of the coefficient that is not a DC coefficient based on scan mode information in the encoding information.

The determining the scan mode information may include: determining whether the DC coefficient is a last coefficient in the transformation coefficients based on last bit information in the encoding information; and when the DC coefficient is not the last coefficient, determining the scan mode of the transformation unit based on the scan mode information.

The video encoding method may further include: determining coding units having a tree structure comprising coding units having coded depths and determining transformation units and prediction units according to the coding units having the coded depths, in order to output an encoding result, from among deeper coding units having a hierarchical structure according to depths indicating a number of times at least one maximum coding unit is spatially split, according to the at least one maximum coding unit; and encoding and outputting symbols including image data encoded based on the coding units having the tree structure and encoding information about coded depths and encoding modes of the coding units having the tree structure, according to each maximum coding unit.

The parsing may include parsing the encoding information from the bitstream, and the determining of the scan mode may include: determining an encoding mode of the transformation unit based on the encoding information; and determining the scan mode based on the encoding mode of the transformation unit.

The video decoding method may further include: extracting encoding data of a picture and symbols including encoding information about coded depths and encoding modes, according to coding units having a tree structure included in each maximum coding unit obtained by splitting the picture, from the parsed bitstream; reading the information about coded depths and encoding modes of the coding units having the tree structure, transformation units, and prediction units by determining a symbol decoding method according to each maximum coding unit; and decoding encoded data based on the coding units having the tree structure, the transformation units, and the prediction units, by using the information about the coded depths and the encoding modes.

The coding units having the coded depths may be determined according to deeper coding units independently from neighboring deeper coding units, from among deeper coding units, and the coding units according to the tree structure may include coding units having coded depths that are hierarchical in a same region and are independent in different regions, in the maximum coding unit.

According to an aspect of another exemplary embodiment, there is provided a video encoding apparatus including: a transformer configured to generate transformation coefficients by performing transformation based on a transformation unit to encode an image; a scan mode determiner configured to determine a scan mode, from among a plurality of scan modes, indicating a scanning direction of the generated transformation coefficients, based on characteristics of the transformation coefficients; a transformation coefficient outputter configured to output the generated transformation coefficients according to an encoding order determined based on the scanning direction of the determined scan mode; and a processor configured to control operations of the transformer, the scan mode determiner, and the transformation coefficient outputter.

According to an aspect of another exemplary embodiment, there is provided a video decoding apparatus including: a parser configured to parse, from a bitstream of a received video, transformation coefficients encoded based on a transformation unit; a scan mode determiner configured to determine a scan mode, from among a plurality of scan modes, of the transformation unit, based on characteristics of the parsed transformation coefficients; an inverse transformer configured to inverse-transform the transformation unit in which the transformation coefficients are arranged, according to a scanning direction indicated by the determined scan mode; and a processor configured to control operations of the parser, the scan mode determiner, and the inverse transformer.

According to an aspect of another exemplary embodiment, there is provided a computer-readable recording medium having recorded thereon a program for executing the video encoding method using a selective scan mode.

According to an aspect of another exemplary embodiment, there is provided a computer-readable recording medium having recorded thereon a program for executing the video decoding method using a selective scan mode.

DESCRIPTION OF THE DRAWINGS

FIG. 1 is a block diagram of a video encoding apparatus according to an exemplary embodiment;

FIG. 2 is a block diagram of a video decoding apparatus according to an exemplary embodiment;

FIG. 3 illustrates transformation coefficients of a transformation unit in a 4×4 block;

DETAILED DESCRIPTION OF EXEMPLARY EMBODIMENTS

Figure 4:
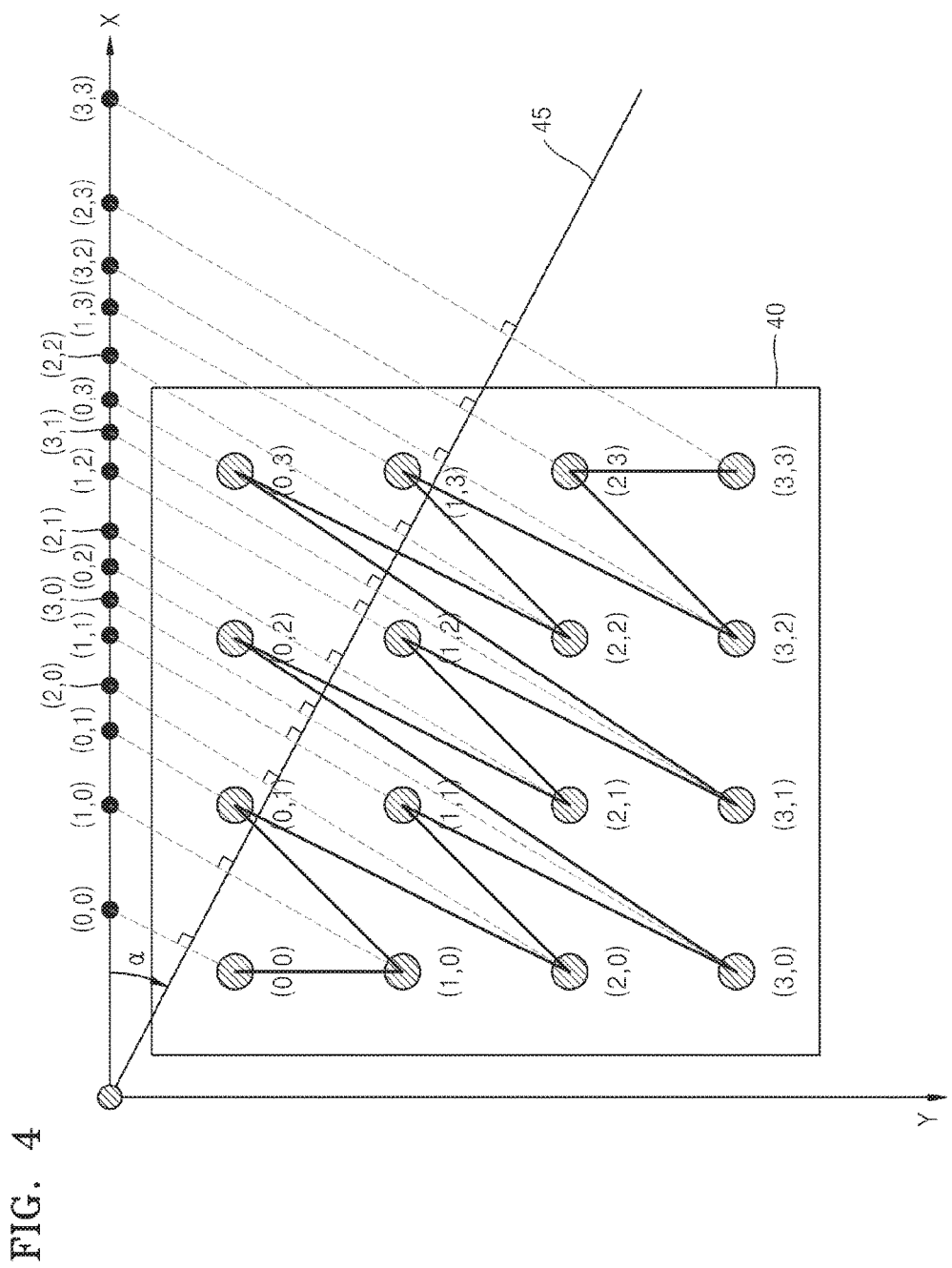
FIG. 4 is a diagram for describing a method of determining a scanning direction of transformation coefficients, according to an exemplary embodiment.

Hereinafter, encoding and decoding a video using a selective scan mode wherein a scanning direction of transformation coefficients is selectively determined, according to one or more exemplary embodiments will be described with reference to FIGS. 1 through 8. Also, encoding and decoding a video using a selective scan mode while encoding and decoding the video based on coding units and transformation units having a tree structure, according to one or more exemplary embodiments will be described with reference to FIGS. 9 through 23. Expressions such as "at least one of," when preceding a list of elements, modify the entire list of elements and do not modify the individual elements of the list.

First, video encoding and decoding methods and apparatuses using a selective scan mode will be described with reference to FIGS. 1 through 8.

FIG. 1 is a block diagram of a video encoding apparatus 10 according to an exemplary embodiment.

The video encoding apparatus 10 includes a transformer 12, a scan mode determiner 14, and a transformation coefficient output unit 16 (e.g., transformation coefficient outputter).

The video encoding apparatus 10 may also include a central processor (not shown) for controlling the transformer 12, the scan mode determiner 14, and the transformation coefficient output unit 16. Alternatively, the transformer 12, the scan mode determiner 14, and the transformation coefficient output unit 16 may be operated by individual processors (not shown), and the video encoding apparatus 10 may operate as the individual processors mutually operate with each other. Alternatively, the transformer 12, the scan mode determiner 14, and the transformation coefficient output unit 16 may be controlled according to a control of an external processor (not shown) of the video encoding apparatus 10.

The video encoding apparatus 10 may further include at least one data storage unit (not shown) (e.g., data storage) in which input and output data of the transformer 12, the scan mode determiner 14, and the transformation coefficient output unit 16 is stored. The video encoding apparatus 10 may further include a memory controller (not shown) for managing data input and output of the at least one data storage unit.

The video encoding apparatus 10 performs transformation on images of a video in order to encode the video. The transformation for encoding the video is used to split an image into predetermined data units and change pixel values in a spatial domain of each data unit to values in a predetermined transformation domain since values in a transformation domain that have been obtained without losing image characteristics of pixel values in a spatial domain are easily compressed compared to the pixel values in the spatial domain. Hereinafter, a data unit for transformation is referred to as a "transformation unit".

The video encoding apparatus 10 encodes transformation coefficients generated by transforming an image. An encoding order of transformation coefficients included in one transformation unit may be determined according to a scanning direction of the transformation coefficients. The video encoding apparatus 10 may variously determine a scanning direction of transformation coefficients. The video encoding apparatus 10 may selectively determine one of a plurality of scanning directions as a scanning direction of transformation coefficients according to image characteristics of a transformation unit.

Since an encoding order of transformation coefficients included in a transformation unit is determined according to a scanning direction of the transformation coefficients, a "scan mode" of the transformation unit indicates the scanning direction and the encoding order of the transformation coefficients. A plurality of scan modes may be used to indicate a plurality of scanning directions and encoding orders. Accordingly, the video encoding apparatus 10 may selectively determine a scan mode of a current transformation unit form among a plurality of scan modes.

The transformer 12 generates transformation coefficients by performing transformation based on a transformation unit in order to encode an image. After the video encoding apparatus 10 performs inter prediction or intra prediction to encode a video, the transformer 12 may perform transformation on a prediction error. The transformation coefficient generated by the transformer 12 may be a quantized transformation coefficient generated via transformation and quantization.

A transformation unit may be a block having a predetermined size, such as 4×4, 8×8, 16×16, and 64×64. Transformation may be orthogonal transformation, such as discrete cosine transform (DCT), discrete sine transform (DST), or discrete wavelet transform (DWT). Alternatively, transformation may be transformation based on any one of various basis functions, such as a spline basis function and polynomial basis function. Alternatively, transformation may be modification of basic transformation, such as modified DCT, modified DCT with windowing, or rotational transformation.

The scan mode determiner 14 determines a scanning direction of transformation coefficients from among a plurality of scanning directions, based on characteristics of the transformation coefficients generated by the transformer 12. In other words, the scan mode determiner 14 determines a scan mode of a transformation unit based on characteristics of transformation coefficients of the transformation unit.

The transformation coefficient output unit 16 outputs the transformation coefficients based on the scan mode determined by the scan mode determiner 14. Since the encoding order of the transformation coefficients is determined according to the scan mode of the transformation unit, i.e., the scanning direction of the transformation coefficients, the transformation coefficient output unit 16 may output the transformation coefficients according to the determined encoding order.

The scan mode determiner 14 may determine the scan mode from a zigzag scan mode, a horizontal scan mode, and a vertical scan mode.

The scan mode determiner 14 may determine the scan mode when the transformation coefficients of the transformation unit include a coefficient that is not a direct current (DC) coefficient. Here, when the transformation coefficients of the transformation unit only include DC coefficients, the scan mode determiner 14 may not determine a scan mode. Generally, when a DC coefficient is not a last coefficient in transformation coefficients that start from a DC coefficient, a scan mode may be determined since a coefficient that is not a DC coefficient exists.

The scan mode determiner 14 may determine the scan mode based on an encoding mode of the transformation unit. For example, the scan mode determiner 14 may determine the scan mode for encoding a transformation unit based on any one of various encoding modes, such as a prediction direction for intra prediction, a slice type for inter prediction, a partition type for inter prediction, an entropy encoding method, and a secondary transformation method. A secondary transformation method may be used as an encoding mode when transformation for encoding is performed according to a series of transformation of primary transformation and secondary transformation.

The video encoding apparatus 10 may individually determine a transformation unit that is a data unit for transformation and a prediction unit that is a data unit for prediction, in a coding unit that is a data unit for outputting an encoding result of an image. Accordingly, a size of a coding unit is equal to or larger than sizes of a transformation unit and a prediction unit, and shapes of a transformation unit and a prediction unit may not be the same. In this case, the video encoding apparatus 10 may determine a size of a coding unit, a size of a prediction unit of a coding unit, and a size of a transformation unit of a coding unit as encoding modes.

Accordingly, the scan mode determiner 14 may determine the scan mode of the transformation unit based on encoding modes, such as a size of a transformation unit, a size of a coding unit including a transformation unit, and a size of a prediction unit of a coding unit.

The scan mode determiner 14 may determine the scan mode of the transformation unit based not only on the encoding mode of the transformation unit, but also on an encoding mode of a coding unit including the transformation unit and an encoding mode of a prediction unit of the coding unit.

The scan mode determiner 14 may determine the scan mode of the transformation unit based on at least one of various encoding modes related to the transformation unit. In other words, the scan mode may be determined according to one encoding mode. For example, the scan mode of the transformation unit may be determined according to an intra prediction direction used to generate the transformation coefficients. Alternatively, the scan mode may be determined by considering a combination of at least two encoding modes. For example, the scan mode may be determined by considering both of a size of the transformation unit and an intra prediction direction.

The scan mode determiner 14 may determine the scan mode of the transformation unit by referring to at least one of an encoding mode and a scan mode of a data unit adjacent to the transformation unit.

When an encoding mode or scan mode of a transformation unit has a predetermined value, the scan mode determiner 14 determines a scan mode according to the encoding mode or scan mode having the predetermined value, and in other cases, the scan mode determiner 14 may select a predetermined scan mode. For example, the scan mode determiner 14 may determine a scan mode according to intra prediction direction only when the intra prediction direction is in a predetermined direction, and may determine a scan mode regardless of intra prediction direction when the intra prediction direction is in any other direction.

The transformer 12 may generate transformation coefficients of a transformation unit according to color components by performing transformation according to color components of an image. For example, transformation coefficients of a transformation unit may be generated according to Y, Cr, Cb components of a YCrCb color format. Alternatively, transformation coefficients of a transformation unit may be generated according to Y, U, V components of a YUV color format, or according to R, G, B components of a RGB color format.

The scan mode determiner 14 may determine the scan mode of the transformation unit according to color components. Scan modes of transformation units of luma and chroma components may be individually determined. Scan modes of transformations unit of first and second chroma components may be individually determined. Selectively, the scan modes of the transformation units of the first and second chroma components may be determined to be same.

The scan mode determiner 14 may determine a scan mode of a transformation unit of a second color component based on at least one of an encoding mode and a scan mode of a transformation unit of a first color component. For example, a scan mode of a transformation unit of a chroma component may be determined based on at least one of an encoding mode and a scan mode of a transformation unit of a luma component.

The scan mode determiner 14 may first determine encoding modes of transformation coefficients of a second color component based on at least one of an encoding mode and a scan mode of a transformation unit of a first color component, and then determine a scan mode of a transformation unit of a second color component based on an encoding mode of a transformation unit of a second color component.

The scan mode determiner 14 may determine a scan mode of a transformation unit of a second color component according to an encoding mode or scan mode having a predetermined value when an encoding mode or scan mode of a transformation unit of a first color component has the predetermined value. When the encoding mode or scan mode of the transformation unit of the first color component does not have a predetermined value, the scan mode of the transformation unit of the second color component may be determined to be a predetermined scan mode regardless of the encoding mode of the transformation unit of the first color component.

For example, the scan mode determiner 14 may determine a scan mode of a transformation unit of a chroma component according to a scan mode of a transformation unit of a luma component when intra prediction direction of a luma component is in a predetermined direction. However, when the intra prediction direction of the luma component is not in the predetermined direction, the scan mode determiner 14 may separately determine the scan mode of the transformation unit of the chroma component regardless of the intra prediction direction of the luma component.

As described above, in order to determine a scan mode of a current transformation unit based on an encoding mode related to the current transformation unit, or an encoding mode or scan mode of another color component, the scan mode determiner 14 may use at least one of the encoding mode related to the current transformation unit and the encoding mode or scan mode of the other color component, and a lookup table about a corresponding relation between scan modes of corresponding transformation units. The scan mode determiner 14 may search for and select the scan mode of the current transformation unit corresponding to the encoding mode related to the current transformation unit or the encoding mode or scan mode of the other color component, by using the lookup table.

The lookup table may include a mapping table about a mapping relation between intra prediction directions and scan modes. Accordingly, the scan mode determiner 14 may determine a scan mode corresponding to an intra prediction direction by using the mapping table of the intra prediction directions and scan modes. For example, the same mapping table may be used to determine each of scan modes of luma and chroma components by using the mapping table.

Since the mapping relation between the intra prediction directions and scan modes may be variously determined according to sizes of prediction units, different mapping tables may be used according to sizes of prediction units.

However, sizes of prediction units of luma and chroma components may be different. When different mapping tables are used according to sizes of prediction units, different mapping tables may be used to determine scan modes of luma and chroma components.

The scan mode determiner 14 may determine and compare encoding efficiencies of transformation coefficients according to a plurality of scan modes, and determine a scan mode having a highest encoding efficiency based on results of the comparing. For example, the scan mode determiner 14 may determine encoding results after outputting transformation coefficients according to a plurality of scanning directions and determine rate-distortion (RD) values of the encoding results to select a scan mode in a scanning direction that has a smallest RD value from among the RD values of the scanning directions.

A predetermined scanning direction may be determined based on a diagonal line having a predetermined angle with an X- or Y-axis. An encoding order of transformation coefficients may be determined according to points where perpendiculars from the transformation coefficients to a diagonal line intersect the X- or Y-axis, as will be described below with reference to FIG. 4.

The video encoding apparatus 10 may encode scan mode information indicating the scan mode determined by the scan mode determiner 14. The video encoding apparatus 10 may encode the scan mode information, and output the scan mode information together with the transformation coefficients output from the transformation coefficient output unit 16. A bit string of the output transformation coefficients and the scan mode information may be output as a bitstream.

The video encoding apparatus 10 may encode scan mode information regarding some of a plurality of selectable scan modes. The video encoding apparatus 10 may encode the scan mode information such that a scan mode indicated by the scan mode information is selected with respect to the some scan modes, and classify scan modes such that a scan mode is determined based on the encoding mode related to the current transformation unit, or the encoding mode or scan mode of the other color component with respect to other scan modes.

The video encoding apparatus 10 may encode scan mode information indicating a scan mode determined when transformation coefficients include a coefficient that is not a DC coefficient. In this case, the video encoding apparatus 10 may encode last bit information indicating whether a DC coefficient is a last coefficient in transformation coefficients. When a DC coefficient is not the last coefficient, the video encoding apparatus 10 may encode scan mode information indicating the scan mode determined by the scan mode determiner 14.

The scan mode determiner 14 may newly determine a scan mode of a transformation unit according to predetermined data units, such as transformation units, coding units, slices, pictures, or sequences. Alternatively, the video encoding apparatus 10 may encode scan mode information determined according to predetermined data units. For example, the video encoding apparatus may signal scan mode information according to slices through slice headers, according to sequences through sequence parameter sets (SPSs), or according to pictures through picture parameter sets (PPSs).

The scan mode determiner 14 may determine a scan mode set including selectable scan modes. The scan mode determiner 14 may determine a scan mode set according to predetermined data units, such as slices, pictures, or sequences. The video encoding apparatus 10 may encode a scan mode set according to predetermined data units, such as slices, pictures, or sequences.

The video encoding apparatus 10 may perform a video encoding operation including transformation by operating in connection with an internal video encoding processor mounted therein or an external video encoding processor, in order to output a video encoding result. The internal video encoding processor of the video encoding apparatus 10 may perform basic video encoding processes as not only an individual processor, but also the video encoding apparatus 10, a central processing apparatus, or a graphic operation apparatus include a video encoding processing module.

FIG. 2 is a block diagram of a video decoding apparatus 20 according to an exemplary embodiment.

The video decoding apparatus 20 includes a parser 22, a scan mode determiner 24, and an inverse transformer 26.

The video decoding apparatus 20 may also include a central processor (not shown) for controlling the parser 22, the scan mode determiner 24, and the inverse transformer 26. Alternatively, the parser 22, the scan mode determiner 24, and the inverse transformer 26 may be operated by individual processors (not shown), and the video decoding apparatus 20 may operate as the individual processors mutually operate with each other. Alternatively, the parser 22, the scan mode determiner 24, and the inverse transformer 26 may be controlled according to a control of an external processor (not shown) of the video decoding apparatus 20.

The video decoding apparatus 20 may further include at least one data storage unit (not shown) in which input and output data of the parser 22, the scan mode determiner 24, and the inverse transformer 26 is stored. The video decoding apparatus 20 may further include a memory controller (not shown) for managing data input and output of the at least one data storage unit.

The video decoding apparatus 20 receives a bitstream constituting encoded data of a video. The parser 22 may parse encoded transformation coefficients based on a transformation unit, from the received bitstream. The parsed transformation coefficients may be quantized transformation coefficients. The scan mode determiner 24 may determine a scan mode of the transformation unit from among a plurality of scan modes, based on characteristics of the parsed transformation coefficients. The inverse transformer 26 may inverse-transform a transformation unit in which transformation coefficients are arranged according to a scanning direction and a decoding order indicated by the scan mode determined by the scan mode determiner 24.

The video decoding apparatus 20 may perform inverse transformation on the parsed transformation coefficients in order to decode the video. In order to decode the video, the transformation coefficients included in the transformation unit may be inverse-transformed based on a transformation unit corresponding to the transformation unit on which transformation has been performed. Accordingly, the inverse transformer 26 may correctly inverse-transform the transformation coefficients only when the video decoding apparatus 20 forms the transformation unit by arranging the transformation coefficients according to an order of transformation coefficients encoded and output by the video encoding apparatus 10. The inverse transformer 26 may perform inverse transformation after performing inverse quantization on the transformation coefficients. A prediction error is restored as a result of inverse transformation performed by the inverse transformer 26, and an image may be restored from the prediction error as the video decoding apparatus 20 performs intra prediction, inter prediction and motion compensation by using prediction information in an encoding mode.

Since the transformation coefficients have been encoded according to a scanning direction selectively determined from among a plurality of scanning directions by the video encoding apparatus 10, the scan mode determiner 24 may select a scan mode identical to the scan mode selectively determined by the video encoding apparatus 10. Accordingly, like the video encoding apparatus 10, the video decoding apparatus 20 may also decode the video by selectively determining one of a plurality of scan modes as a scan mode of transformation coefficients according to image characteristics of a transformation unit.

The scan mode determiner 24 may determine the scan mode from among a zigzag scan mode, a horizontal scan mode, and a vertical scan mode.

The scan mode determiner 24 may determine a scan mode when the transformation coefficients include a coefficient that is not a DC coefficient. The scan mode may be determined when a DC coefficient is not a last coefficient in the transformation coefficients of the transformation unit.

The scan mode determiner 24 may determine a scan mode of a transformation unit based on an encoding mode of the transformation unit. The video decoding apparatus 20 may decode the video using the encoding mode.

After the parser 22 parses encoding information from the bitstream, the scan mode determiner 24 may determine an encoding mode of a transformation unit based on the encoding information, and may determine a scan mode based on the encoding mode of the transformation unit.

The scan mode determiner 24 may determine the scan mode of the transformation unit for decoding transformation coefficients based on encoding modes, such as a prediction direction for intra prediction, a slice type for inter prediction, a partition type for inter prediction, an entropy decoding method, and a secondary transformation method.

When the video decoding apparatus 20 performs video decoding based on coding units, transformation units, or prediction units having variable sizes and shapes, the scan mode determiner 24 may determine the scan mode based on at least one of a size of a transformation unit, a size of a coding unit including the transformation unit, and a size of a prediction unit of the coding unit, which are set as encoding modes.

The scan mode determiner 24 may determine the scan mode according to at least one encoding mode from among a transformation unit, and a coding unit and a prediction unit related to the transformation unit. The scan mode determiner 24 may determine the scan mode of the transformation unit by referring to at least one of an encoding mode and a scan mode of a neighboring data unit of the transformation unit.

The scan mode determiner 24 may determine the scan mode based on a combination of one or more of various encoding modes related to the transformation unit.

When an encoding mode or scan mode of a transformation unit has a predetermined value, the scan mode determiner 24 may determine a scan mode according to the encoding mode or scan mode having the predetermined value, and may determine a predetermined scan mode in other cases. For example, only when an intra prediction direction for transformation coefficients of a transformation unit is determined to be a predetermined direction, the scan mode determiner 24 determines a scan mode according to the intra prediction direction, and may determine one of scan modes indicating predetermined scanning directions independent from the intra prediction direction in other cases.

After the parser 22 parses transformation coefficients of a transformation unit according to color components, the scan mode determiner 24 may determine a scan mode of a transformation unit according to color components. For example, the scan mode determiner 24 may individually determine scan modes of transformation units of luma and chroma components. Scan modes of transformation units of first and second chroma components may be determined respectively. Here, the scan mode of the transformation unit of the luma component may be individually determined, while the scan modes of the transformation units of the first and second chroma components may be determined to be the same.

The scan mode determiner 24 may determine a scan mode of a transformation unit of a second color component based on at least one of an encoding mode and a scan mode of a transformation unit of a first color component. Also, when an encoding mode of the transformation unit of the second color component is determined based on at least one of the encoding mode and the scan mode of the transformation unit of the first color component, the scan mode determiner 24 may determine the scan mode of the transformation unit of the second color component based on the encoding mode of the transformation unit of the second color component.

Alternatively, the scan mode determiner 24 may determine the scan mode of the transformation unit of the second color component only when the encoding mode or scan mode of the transformation unit of the first color component has a predetermined value, and may determine one of predetermined scan modes as the scan mode of the transformation unit of the second color component regardless of the encoding mode or scan mode of the transformation unit of the first color component when the encoding mode or scan mode of the transformation unit of the first color component does not have a predetermined value.

For example, when an intra prediction direction for transformation coefficients of a transformation unit of a luma component is determined to be a predetermined direction, the scan mode determiner 24 may determine a scan mode of a transformation unit of a chroma component according to a scan mode of the transformation unit of the luma component. However, in other cases, the scan mode determiner 14 may determine one of predetermined scan modes as the scan mode of the transformation unit of the chroma component regardless of the intra prediction direction of the transformation unit of the luma component.

The scan mode determiner 24 may determine a scan mode of a current transformation unit according to an encoding mode related to the current transformation unit, or an encoding mode or scan mode of another color component, by using a lookup table. The lookup table used by the scan mode determiner 24 may correspond to a lookup table used by the scan mode determiner 14 of the video encoding apparatus 10. In other words, the video encoding and decoding apparatuses 10 and 20 may store the same lookup table about corresponding relations between a scan mode of a current transformation unit and encoding modes related to transformation units, or encoding modes or scan modes of other color components.

The parser 22 may parse scan mode information of a transformation unit from the bitstream. The scan mode determiner 24 may determine a scan mode of a transformation unit indicated by the scan mode information by reading the parsed scan mode information.

A scan mode indicated by the scan mode information may be a scan mode determined to have a highest encoding efficiency based on results of comparing encoding efficiencies determined based on results of encoding transformation coefficients according to a plurality of scan modes while the video encoding apparatus 10 outputs a bitstream of the transformation coefficients. Accordingly, the scan mode determiner 24 may determine a scan mode having a highest encoding efficiency for the current transformation unit from among a plurality of scan modes by reading the parsed scan mode information.

A scanning direction is determined based on a diagonal line having a predetermined angle with an X- or Y-axis of a transformation unit, and an arrangement order of transformation coefficients may be determined according to points where perpendiculars from the transformation coefficients to the diagonal line intersect the X- or Y-axis.

The scan mode determiner 24 may determine a scan mode based on scan mode information with respect to some scan modes from among a plurality of selectable scan modes. The scan mode determiner 24 may determine some scan modes indicated by the scan mode information only when there is the parsed scan mode information. When the scan mode information is not parsed, the scan mode determiner 24 may determine one of predetermined scan modes based on an encoding mode related to a transformation unit, or an encoding mode or scan mode of another color component.

When the transformation coefficients do not include a coefficient that is not a DC coefficient, the video decoding apparatus 20 may parse the scan mode information. Here, the parser 22 may parse last bit information indicating whether a DC coefficient is a last coefficient in the transformation coefficients, from the bitstream. When a DC coefficient is not the last coefficient based on the last bit information, the parser 22 may parse the scan mode information from the bitstream, and the scan mode determiner 24 may determine the scan mode based on the scan mode information.

The scan mode determiner 24 may determine the scan mode of the transformation unit according to coding units, slices, pictures, or sequences. Also, if the scan mode information is to be parsed, the parser 22 parses the scan mode information according to coding units, slices, pictures, or sequences. For example, the parser 22 may parse the scan mode information of each slice from a corresponding slice header, of each sequence from a corresponding SPS, or of each picture from a corresponding PPS.

The scan mode determiner 24 may use a scan mode set including selectable scan modes. The scan mode determiner 14 may use a new scan mode set according to predetermined data units, such as slices, pictures, or sequences. The video decoding apparatus 20 may parse a scan mode set from the bitstream, according to predetermined data units, such as slices, pictures, or sequences.

The video decoding apparatus 20 may perform a video decoding operation including inverse transformation by operating in connection with an internal video decoding processor mounted therein or an external video decoding processor, in order to output a video decoding result. The internal video decoding processor of the video decoding apparatus 20 may perform basic video decoding processes as not only an individual processor, but also the video decoding apparatus 20, a central processing apparatus, or a graphic operation apparatus include a video decoding processing module.

A scanning direction of transformation coefficients will now be described with reference to FIGS. 3 and 4.

FIG. 3 illustrates transformation coefficients of a transformation unit 30 in a 4×4 block.

As described above, the video encoding and decoding apparatuses 10 and 20 may use transformation units having various sizes, instead of a fixed size. Here, for convenience of description, the transformation unit 30 of FIG. 3 is in a 4×4 block.

The transformation coefficients of the transformation unit 30 may be encoded in a predetermined order determined according to a scanning direction. However, not all of the transformation coefficients are encoded. For example, when the transformation coefficients are arranged according to an encoding order and "0" coefficients are continuously located at the end, the series of "0" coefficients may be skipped without being encoded. Accordingly, finally encoded transformation coefficients from among entire transformation coefficients of the transformation unit 30 may be determined according to the scanning direction.

The finally encoded transformation coefficients may form a significant map of the transformation unit 30, and a data compression rate may be increased when a length of the significant map is decreased whereas the data compression rate may be decreased when the length of the significant map is increased.

On the other hand, compressed data may be restored by using the significant map, by replacing transformation coefficients that are not included in the significant map by 0 to rearrange and then inverse-transform the entire transformation coefficients of the transformation unit 30.

For example, when the transformation coefficients of the transformation unit 30 are encoded according to a zigzag scan mode, the transformation coefficients may be encoded in an order starting from 10 that is a DC coefficient to 3, 4, 2, 0, 0, 0, 0, 0, and 1. Since remaining transformation coefficients after 1 are all 0, the remaining transformation coefficients may not be encoded. 10, 3, 4, 2, 0, 0, 0, 0, 0, 1 may be input to the significant map of the transformation unit 30 according to the zigzag scan mode.

Alternatively, when a vertical scan mode is used, the transformation coefficients of the transformation unit 30 may be scanned in a vertical direction from 10 that is the DC coefficient and encoded in an order of 10, 4, 2, 1, and 3. Since remaining transformation coefficients after 3 are all 0, the remaining transformation coefficients may not be encoded. In other words, 10, 4, 2, 1, 3 may be input to the significant map of the transformation unit 30 according to the vertical scan mode.

Since the significant map of the transformation unit 30 according to the zigzag scan mode includes a plurality of intermediate coefficients that are 0, a length of the significant map generated according to the vertical scan mode is shorter than that generated according to the zigzag scan mode. Accordingly, a data compression rate, i.e., an encoding efficiency, may be increased when the transformation coefficients of the transformation unit 30 are encoded according to the vertical scan mode. In other words, a length of a significant map may vary according to a scan mode.

When a size of a transformation unit is increased, a length of continuous "0" coefficients in a significant map may be increased, and if a bit string of the continuous "0" coefficients is located in the center and thus cannot be omitted, encoding efficiency may be remarkably decreased. Accordingly, in order to effectively encode an image based on a large transformation unit, it is important to reduce a length of a significant map. Thus, the video encoding and decoding apparatuses 10 and 20 determine an encoding order and a scanning direction of transformation coefficients such that a length of a significant map is reduced.

A scan mode may be determined to be one of a zigzag scan mode, wherein transformation coefficients are scanned in a zigzag direction from a DC coefficient, a vertical scan mode, wherein transformation coefficients are scanned in a vertical direction from a DC coefficient, and a horizontal scan mode, wherein transformation coefficients are scanned in a horizontal direction from a DC coefficient.

A scan mode that generates a shortest significant map may be selected after generating significant maps in all of a zigzag scan mode, a vertical scan mode, and a horizontal scan mode. Alternatively, a scan mode of a current transformation unit may be selected from a zigzag scan mode, a vertical scan mode, and a horizontal scan mode, based on an encoding mode of at least one of the current transformation unit, a coding unit, a prediction unit, and a neighboring data unit.

FIG. 4 is a diagram for describing a method of determining a scanning direction of transformation coefficients, according to an exemplary embodiment. Referring to FIG. 4, not only a zigzag scan mode, a vertical scan mode, and a horizontal scan mode, but also a predetermined scanning direction are described.

A width and a length of a transformation unit 40 are respectively X- and Y-axes, and transformation coefficients of the transformation unit 40 are indicated as (x,y) according to an orthogonal coordinates system.

A scanning direction may be defined by a diagonal line 45 passing between the X- and Y-axes from the origin where the X- and Y-axes of the transformation unit 40 intersect. The scanning direction may be represented by an angle formed by the diagonal line 45 and the X- or Y-axis. In FIG. 4, an angle α formed by the diagonal line 45 and the X-axis may be used as an index indicating the scanning direction, i.e., as a scan mode.

An encoding order of the transformation coefficients indicated by each scan mode may be determined according to points where perpendiculars from the transformation coefficients to the diagonal line 45 intersect the X-axis of the transformation unit 40.

Referring to FIG. 4, according to an encoding order of the transformation coefficients in a scan mode α, the transformation coefficients may be encoded in an order of (0,0), (1,0), (0,1), (2,0), (1,1), (3,0), (0,2), (2,1), (1,2), (3,1), (0,3), (2,2), (1,3), (3,2), (2,3), and (3,3) according to an order of points where the perpendiculars from the transformation coefficients to the diagonal line 45 intersect the X-axis.

When the angle α is 0°, a scan mode may be a horizontal scan mode, when the angle α is 90°, a scan mode may be a vertical scan mode, and when the angle α is 45°, a scan mode may be a zigzag scan mode. Here, when the angle α is larger than 0° and smaller than 90° aside from 0°, 45°, and 90°, a scan mode according to a predetermined scan direction, aside from a horizontal scan mode, a vertical scan mode, and a zigzag scan mode, may be defined.

The video encoding and decoding apparatuses 10 and 20 may determine a scan mode set including selectable scan modes. A scan mode set may basically include a zigzag scan mode, a horizontal scan mode, and a vertical scan mode. Also, the scan mode set may not only include these three basic scan modes, but also at least one scan mode according to an angle α of a predetermined diagonal line as described above with reference to FIG. 3.

For example, the video encoding apparatus 10 may determine an optimum scan mode for reducing an RD value according to transformation units included in a predetermined image unit, such as a partial region of an image, a slice, a picture, a frame, or a sequence, and form a scan mode set including the determined scan mode. Alternatively, the video encoding apparatus 10 may determine an optical scan mode set by appointing frequent scan modes based on statistics of determined scan modes of transformation units.

Alternatively, a scan mode set including a zigzag scan mode, a horizontal scan mode, and a vertical scan mode, in addition to scan modes determined based on statistics of scan modes for reducing an RD value for each transformation unit, or scan modes of neighboring transformation units may be determined.

The video encoding and decoding apparatuses 10 and 20 may select an optimum scan mode for a current transformation unit from the scan mode set, based on characteristics of transformation coefficients.

According to a horizontal scan mode and a vertical scan mode, transformation coefficients may be scanned only in a horizontal or vertical direction from a DC coefficient. However, in order to use another scan mode, a lookup table about a corresponding relation between scan modes and scan orders of transformation coefficients may be used. In order for the video encoding and decoding apparatus 10 and 20 to scan transformation coefficients according to various scan modes, a scan order of the transformation coefficients is determined by accessing the lookup table in terms of hardware.

Accordingly, in order to reduce a data bandwidth and hardware components for accessing the lookup table, the video encoding and decoding apparatuses 10 and 20 may use a scan mode set only including a horizontal scan mode and a vertical scan mode without having to use the lookup table.

As described above with reference to FIGS. 1 and 2, the video encoding and decoding apparatuses 10 and 20 may inter and determine a scan mode of a transformation unit based on an encoding mode of transformation coefficients.

For example, an encoding mode for encoding/decoding transformation coefficients may include at least one of a prediction direction for intra prediction, a slice type for inter prediction, a partition type for inter prediction, an entropy encoding method, a secondary transformation method, a size of a coding unit, a size of a prediction unit of the coding unit, and a size of a transformation unit of the coding unit.

For example, when image information of a current transformation unit is intra-predicted by using data in a predetermined direction from among neighboring data spatially adjacent to the current transformation unit, an encoding mode indicating an intra prediction direction may be determined. The intra prediction direction may be expressed in an angle from 0° to 360° or −180° to 180°, or in an index indicating an angle.

For example, an encoding mode indicating a prediction method when inter prediction is performed to generate transformation coefficients of a current transformation unit may be determined. For example, an inter prediction method of one of I-, P-, and B-slice types may be determined for each transformation unit included in the same slice. A skip mode or a direct mode may be included as an inter prediction method of a transformation unit. Alternatively, in order to reduce a throughput of inter prediction, an inter prediction of any one of I-, P-, and B-slice types may be identically applied to all transformation units included in one slice.

For example, an encoding mode indicating a partition type used while performing inter prediction to generate transformation coefficients of a current transformation unit may be determined. A 2N×2N block may include partition types indicating partitions split symmetrically as a width or height of the 2N×2N block is halved, for example, 2N×2N, 2N×N, N×2N, and N×N partition types. Alternatively, the 2N×2N block may include 2N×nU, 2N×nD, nL×2N, and nR×2N partition types indicating asymmetrical partitions as the width or height of the 2N×2N block is split at a ratio of 1:3, 3:1, or the like.

For example, an encoding mode indicating a method of entropy-encoding a bit string for outputting transformation coefficients of a current transformation unit may be determined. One of entropy encoding methods, such as context-adaptive variable-length coding (CAVLC) and context-based adaptive binary coding (CABAC), may be selected as an encoding mode.

For example, when transformation performed to generate transformation coefficients of a current transformation unit is a combination of primary transformation and secondary transformation, a secondary transformation method may be determined as an encoding mode. For example, when DCT is performed as primary transformation, one of DST and rotational transformation may be determined as secondary transformation.

For example, as described above, when a coding unit, a transformation unit, and a prediction unit are not same, a size of the coding unit, a size of the prediction unit, and a size of the transformation unit may be each determined as encoding modes.

A scan mode of a transformation unit may be determined based on at least one of various encoding modes. In other words, a scan mode of a transformation unit may be inferred by using one encoding modes, but may alternatively inferred by using a combination of at least two encoding modes.

Alternatively, a scan mode of a current transformation unit may be inferred and determined based on a scan mode that has been pre-determined in a neighboring transformation unit spatially adjacent to the current transformation unit.

Alternatively, as described above with reference to FIGS. 2 and 2, the video encoding and decoding apparatuses 10 and 20 may infer and determine a scan mode of a transformation unit of a second color component based on an encoding mode or scan mode of a transformation unit of a first color component.

For example, an optimum scan mode of a transformation unit of a luma component may be directly selected or may be inferred and determined based on an encoding mode of the transformation unit of the luma component. The scan mode of the transformation unit of the luma component determined as such may be used to infer a scan mode of a transformation unit of a chroma component.

For example, when an intra prediction direction of a chroma component is used as a intra prediction direction of a luma component, scan modes of transformation units of the luma and chroma components may be inferred and based on the same intra prediction direction. However, when the intra prediction direction of the chroma component is determined independently from the intra prediction direction of the luma component, the scan mode of the transformation unit of the chroma component may be determined to be one of basic scan modes, i.e., a zigzag scan mode, a horizontal scan mode, and a vertical scan mode, based on the intra prediction direction of the chroma component.

Alternatively, even when the intra prediction directions of the chroma and luma components are not completely the same, conditions wherein the scan mode of the transformation unit of the chroma component is inferred and determined based on the scan mode of the transformation unit of the luma component may be set.

For example, when the intra predictions of the luma and chroma components are included in a prediction class in the same direction, for example, a horizontal prediction class, a vertical prediction class, or a diagonal prediction class, etc., are adjacent to each other within a predetermined range, the scan mode of the transformation unit of the chroma component may be inferred and determined based on the scan mode of the transformation unit of the luma component.

Alternatively, when the intra prediction directions of the chroma and luma components are opposite or almost opposite, the scan modes of the transformation units of the luma and chroma components may be inferred and determined based on the same intra prediction direction.

However, when above conditions are not satisfied, the scan mode of the transformation unit of the chroma component may be determined from basic scan modes, i.e., a zigzag scan mode, a horizontal scan mode, and a vertical scan mode.

Alternatively, when the intra prediction directions of the luma and chroma components are perpendicular or almost perpendicular to each other, a perpendicular relationship between the intra prediction directions of the luma and chroma components may be analogically reflected to a relationship between the scan modes of the transformation units of the luma and chroma components.

For example, when the intra prediction directions of the luma and chroma components are perpendicular or almost perpendicular to each other, and the scan mode of the transformation unit of the luma component is a horizontal scan mode, the scan mode of the transformation unit of the chroma component may be determined to be a vertical scan mode.

The corresponding relation between the encoding mode and scan mode of the transformation unit of the luma component and the scan mode of the transformation unit of the chroma component described above is contained in the lookup table, and the video encoding and decoding apparatuses 10 and 20 may use the same lookup table.

Also, data about scan modes of neighboring transformation units, which have been determined before a scan mode of a current transformation unit, may be accumulated. Scan modes frequently selected may be determined via statistical analysis based on scan modes pre-selected in neighboring transformation units of the current transformation unit, transformation units in a coding unit, or a neighboring coding unit. The video encoding and decoding apparatuses 10 and 20 may analogically determine the scan mode of the current transformation unit by using a result of the statistical analysis of the scan modes selected before the current transformation unit.

The video encoding and decoding apparatuses 10 and 20 may individually determine a scan mode of a transformation unit according to color components. Alternatively, the same scan mode may be determined according to color components primarily, but when scan modes that are not same are determined, scan mode information indicating different scan modes according to color components may be encoded or decoded, and a scan mode may be analogically determined based on different encoding modes according to color components.

Hereinabove, various exemplary embodiments of an implicit method for analogically determining a scan mode of a transformation unit have been described. The video encoding and decoding apparatuses 10 and 20 may share a method of analogically determining a scan mode of a transformation unit based on an encoding mode of a current transformation unit, or an encoding mode or scan mode of another transformation unit. Accordingly, when the video encoding apparatus 10 selects a scan mode based on an encoding mode of a current transformation unit, or an encoding mode or scan mode of another transformation unit, a scan mode identical to the scan mode selected by the video encoding apparatus 10 may be analogically determined by the video decoding apparatus 20 based on another encoding mode or a scan mode of another transformation unit. As a result, since the video decoding apparatus 20 may arrange transformation coefficients of a transformation unit at their locations in an order the video encoding apparatus 10 encoded the transformation coefficients, and thus the transformation coefficients of the transformation unit may be correctly inverse-transformed.

Hereinafter, exemplary embodiments of an explicit method of determining a scan mode of a transformation unit by using scan mode information will be described with reference to FIGS. 5 and 6. The video encoding apparatus 10 may generate scan mode information designating a scan mode of a transformation unit, and encode and output the scan mode information in a bitstream together with transformation coefficients. The video decoding apparatus 20 may parse and extract not only transformation coefficients, but also scan mode information from a received bitstream, and read the scan mode information to directly determine a scan mode of the transformation coefficients.

Figures 5, 6:
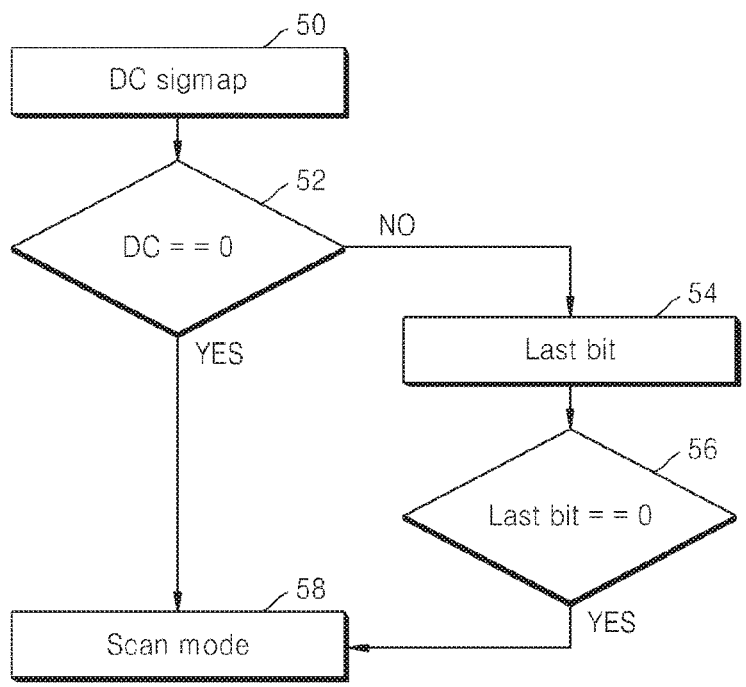
FIG. 5 is a flowchart illustrating a method of determining a scanning direction according to a direct current (DC) coefficient, according to an exemplary embodiment.
FIG. 6 illustrates a syntax of scan mode information, according to an exemplary embodiment.

FIG. 5 is a flowchart illustrating a method of determining a scanning direction according to a DC coefficient, according to an exemplary embodiment.

The video encoding apparatus 10 may generate a DC significant map including transformation coefficients to be encoded in a bitstream from among transformation coefficients of a transformation unit, in operation S50.

In the transformation coefficients of a transformation unit, when only a DC coefficient has a value that is not 0 and remaining coefficients are all 0, only the DC coefficient is encoded when the transformation coefficients of the transformation unit are encoded in any scanning direction, and thus a scan mode may not be encoded. In other words, the transformation coefficients input in the DC significant map are only DC coefficients, encoding of scan mode information may be omitted.

It is determined whether a first coefficient is a DC coefficient in the transformation coefficients of the DC significant map, in operation 52. When the first coefficient is not a DC coefficient (DC==0), scan mode information may be encoded in operation 58. A scan mode wherein transformation coefficients are encoded from a transformation coefficient that is not a DC coefficient may be included in a plurality of scan modes.

However, when the first coefficient is a DC coefficient (DC==1), last bit information indicating whether a DC coefficient is a last bit, i.e., a last coefficient in the transformation coefficients of the DC significant map may be encoded in operation 54.

In operation 56, it is determined whether the DC coefficient that is the first coefficient in the transformation coefficients of the DC significant map is the last coefficient. When the DC coefficient is the first and last coefficients (Last bit==1), encoding of scan mode information may be omitted. On the other hand, when the DC coefficient is not the last coefficient (Last bit==0), the scan mode information may be encoded in operation 58.

The video decoding apparatus 20 may read the scan mode information based on the DC coefficient. The video decoding apparatus 20 may parse the transformation coefficients of the DC significant map of the transformation unit from the bitstream in operation 50.

The video decoding apparatus 20 determines whether the first coefficient is the DC coefficient in the transformation coefficients in operation 52, and if the first coefficient is not a DC coefficient (DC==0), the scan mode information may be parsed from the bitstream in operation 58.

However, if the first coefficient is a DC coefficient (DC==1), the video decoding apparatus 20 may parse the last bit information from the bitstream in operation 54. The video decoding apparatus 20 may determine whether the DC coefficient that is the first coefficient is the last coefficient in the transformation coefficients of the DC significant map based on the last bit information in operation 56.

When it is determined that the DC coefficient that is the first coefficient is the last coefficient (Last bit==1), the video decoding apparatus 20 may determine remaining coefficients of the transformation unit to be 0 and decode only the DC coefficient without having to parse the scan mode information. On the other hand, when it is determined that the DC coefficient is not the last coefficient (Last bit==0), the video decoding apparatus 20 may parse the scan mode information from the bitstream, and determine a scan mode by reading the scan mode information in operation 58. The video decoding apparatus 20 may arrange the DC coefficient and the remaining transformation coefficients according to a scanning direction indicated by the scan mode, and replace all transformation coefficients that are not included in the DC significant map by 0. Then, the video decoding apparatus 20 may inverse-transform entire transformation coefficients of the transformation unit rearranged as such.

FIG. 6 illustrates a syntax of scan mode information, according to an exemplary embodiment.

Scan mode information 'Scan order' in FIG. 6 may be an example of scan mode information encoded or parsed in operation 58 of FIG. 5. However, the syntax of the scan mode information used by the video encoding and decoding apparatuses 10 and 20 is not limited to FIG. 6.

The scan mode information 'Scan order' may be added and encoded as overhead bits to a bitstream in which transformation coefficients are encoded. As described above with reference to FIG. 5, when the transformation coefficients of the transformation unit include a transformation coefficient excluding a DC coefficient, it may be determined whether to encode/parse the scan mode information 'Scan order'.

The scan mode information 'Scan order' may indicate three scan modes, i.e., a zigzag scan mode, a horizontal scan mode, and a vertical scan mode.

When an occurrence frequency of a zigzag scan mode is highest, the video encoding apparatus 10 may use a bit flag of '0' bit as the scan mode information 'Scan order' indicating the zigzag scan mode.

When a scan mode of a current transformation unit is determined to be a zigzag scan mode in operation 58, the '0' bit may be encoded as the scan mode information 'Scan order', and then the encoding process of operation 58 may be completed. If the scan mode of the current transformation unit is not determined to be a zigzag scan mode, the video encoding apparatus 10 may encode an '1' bit as the scan mode information 'Scan order', and may further encode one bit indicating whether the scan mode is a horizontal or vertical scan mode. Accordingly, scan mode information indicating a horizontal or vertical scan mode may be encoded in two bit information '10' or '11' starting with the '1' bit.

In operation 58, when a '0' bit is parsed as the scan mode information, the video decoding apparatus 20 may determine that the scan mode of the current transformation unit is a zigzag scan mode. When a '1' bit is parsed as the scan mode information, the video decoding apparatus 20 may further parse one bit as the scan mode information. Accordingly, when two bit information '10' or '11' starting with a '1' bit is parsed as the scan mode information, the video decoding apparatus 20 may determine that the scan mode of the current transformation unit is a horizontal or vertical scan mode.

Hereinabove, an implicit method of determining a scan mode of a current transformation unit analogically based on an encoding mode of the current transformation unit or an encoding or scan mode of another transformation unit, and an explicit method of determining a scan mode of a current transformation unit based on scan mode information have been described.

Alternatively, the video encoding and decoding apparatus 10 and 20 may determine a scan mode of a transformation unit by combining the implicit and explicit methods.

For example, the implicit method may be used for some of a plurality of selectable scan modes, and the explicit method may be used for remaining scan modes.

For example, when a first encoding mode of a transformation unit is a first mode, the implicit method of determining a scan mode based on the first mode of the first encoding mode of the transformation unit may be used, but when the first encoding mode of the transformation unit is not the first mode, the explicit method of determining remaining scan modes according to scan mode information may be used.

For example, when a second encoding mode or scan mode of a transformation unit of a first color component is a predetermined mode, an implicit method of determining a scan mode of a transformation unit of a second color component based on the predetermined mode may be used. On the other hand, when the second encoding mode or scan mode of the transformation unit of the first color component is not the predetermined mode, an explicit method of determining the scan mode of the transformation unit of the second color component according to scan mode information of the second color component may be used.

For example, when a third encoding mode or scan mode of a neighboring transformation unit is a predetermined mode, an implicit method of determining a scan mode of a current transformation unit based on the predetermined mode is used, but when the third encoding mode or scan mode of the neighboring transformation unit is not the predetermined mode, an explicit method of determining the scan mode of the current transformation unit according to scan mode information of the current transformation unit may be used.

Figure 7:
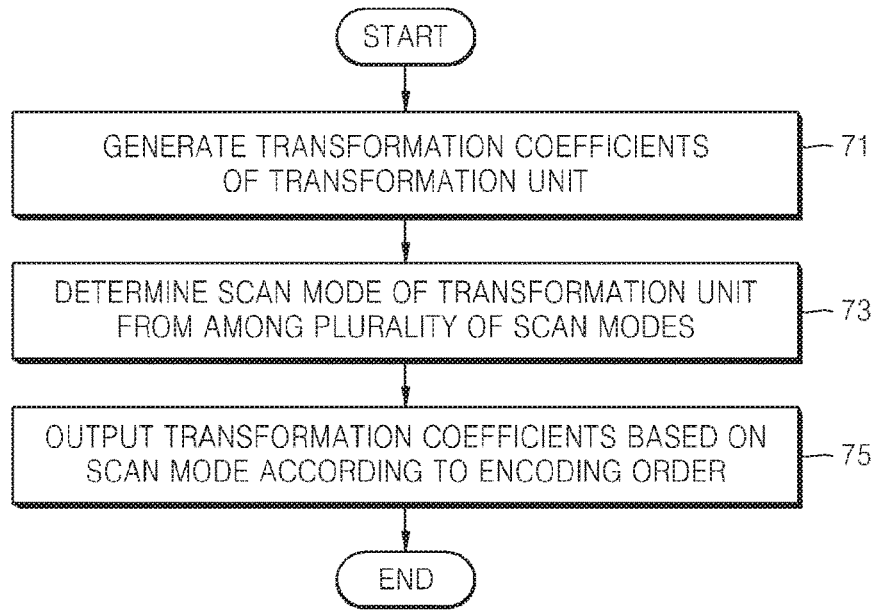
FIG. 7 is a flowchart illustrating a video encoding method according to an exemplary embodiment.

FIG. 7 is a flowchart illustrating a video encoding method according to an exemplary embodiment.

In operation 71, transformation coefficients are generated by performing transformation based on a transformation unit in order to encode an image. The transformation unit may be a block having a predetermined size, such as 4×4, 8×8, or 16×16.

In operation 73, a scan mode of the transformation unit may be determined from among a plurality of scan modes based on characteristics of the transformation coefficients generated in operation 71.

The scan mode may be determined to be one of a zigzag scan mode, a horizontal scan mode, and a vertical scan mode.

The scan mode may be determined when the transformation coefficients of the transformation unit include a coefficient that is not a DC coefficient. The scan mode may be determined based on an encoding mode of the transformation unit. The scan mode may be determined by referring to at least one of an encoding mode or a scan mode of a neighboring data unit of the transformation unit.

The scan mode of the transformation unit may be determined according to color components. A scan mode of a transformation unit of a second color component may be determined based on at least one of an encoding mode and a scan mode of a transformation unit of a first color component.

When the encoding mode or scan mode of the transformation unit of the first color component has a predetermined value, the scan mode of the transformation unit of the second color component may be determined according to the predetermined value. When the encoding mode and scan mode of the first color component does not have the predetermined value, the scan mode of the transformation unit of the second color component may be determined regardless of the encoding mode of the transformation unit of the first color component.

In operation 75, the transformation coefficients are output based on the scan mode determined in operation 71. Since an encoding order of the transformation coefficients is determined according to a scanning direction of the transformation coefficients indicated by the scan mode of the transformation unit, the transformation coefficients may be output according to the encoding order.

Scan mode information indicating the scan mode determined in operation 73 may be encoded. The scan mode information is encoded as overhead bits, and may be output in a bitstream together with the transformation coefficients.

Scan modes may be classified such that scan mode information is encoded with respect to some of a plurality of selectable scan modes, and a scan mode is determined based on an encoding mode related to a transformation unit, or an encoding mode or scan mode of another color component with respect to remaining scan modes.

Scan mode information indicating a scan mode determined when the transformation coefficients include a coefficient that is not a DC coefficient may be encoded. Last bit information indicating whether a DC coefficient is a last coefficient in the transformation coefficients may be encoded. If a DC coefficient is not the last coefficient based on the last bit information, the scan mode information indicating the scan mode determined in operation 73 may be encoded.

A scan mode set of the transformation unit may be determined according to slices, pictures, or sequences. The determined scan mode set may be encoded according to slices, pictures, or sequences.

The video encoding method may perform a basic video encoding operation by using a video encoding processor in order to output video encoding results.

Figure 8:
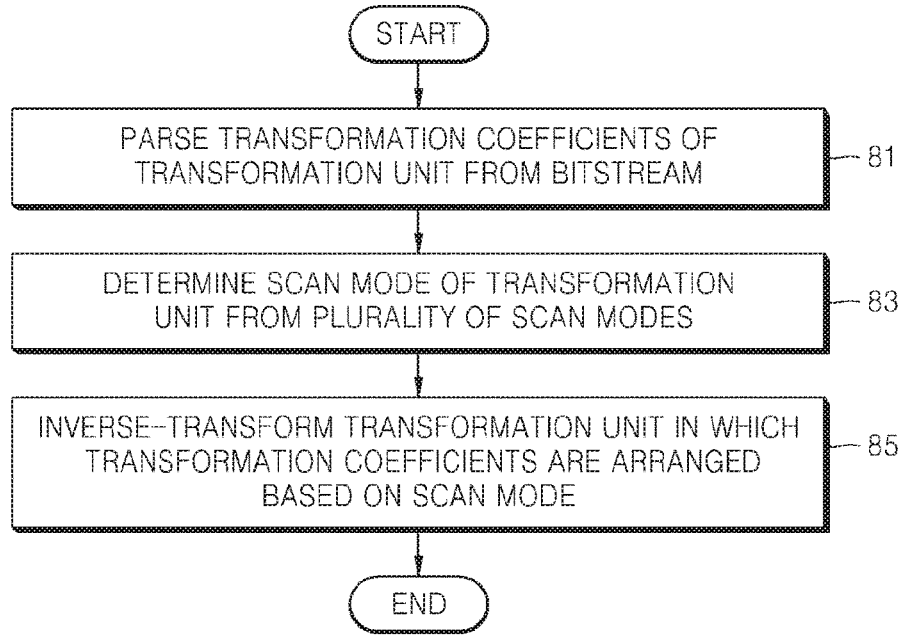
FIG. 8 is a flowchart illustrating a video decoding method according to an exemplary embodiment.

FIG. 8 is a flowchart illustrating a video decoding method according to an exemplary embodiment.

In operation 81, a bitstream including encoded data of a video is received. Encoded transformation coefficients are parsed based on a transformation unit from the received bitstream of the video. In operation 83, a scan mode of the transformation unit is determined from a plurality of scan modes, based on characteristics of the parsed transformation coefficients. In operation 85, the transformation unit in which the transformation coefficients are arranged according to a scanning direction indicated by the scan mode determined in operation 83 is inverse-transformed.

In operation 83, one of a zigzag scan mode, a horizontal scan mode, and a vertical scan mode may be determined as the scan mode. The scan mode may be determined when the transformation coefficients include a coefficient that is not a DC coefficient. The scan mode may be determined when a DC coefficient is not a last coefficient in the transformation coefficients of the transformation unit.

The scan mode of the transformation unit may be determined based on an encoding mode of the transformation unit. The encoding mode may be determined from encoding information parsed from the bitstream, and the scan mode may be determined based on the encoding mode.

The scan mode may be determined based on at least one of a prediction direction for intra prediction, a slice type for inter prediction, a partition type for inter prediction, an entropy decoding method, an encoding mode of secondary transformation method, a size of the transformation unit, a size of an coding unit including the transformation unit, and a size of a prediction unit of the coding unit.

The scan mode of the transformation unit may be determined by referring to at least one of an encoding mode and a scan mode of a neighboring data unit of the transformation unit.

The scan mode of the transformation unit may be determined according to color components. A scan mode of a transformation unit of a second color component may be determined based on at least one of an encoding mode and a scan mode of a transformation unit of a first color component.

When the encoding mode or scan mode of the transformation unit of the first color component has a predetermined value, the scan mode of the transformation unit of the second color component may be determined according to the predetermined value. When the encoding mode or scan mode of the transformation unit of the first color component does not have the predetermined value, the scan mode of the transformation unit of the second color component may be determined to be a predetermined scan mode regardless of the encoding mode of the transformation unit of the first color component.

In operation 81, scan mode information of the transformation unit may be parsed from the bitstream. The scan mode of the transformation unit indicated by the scan mode information may be determined by reading the parsed scan mode information.

When the transformation coefficients include a coefficient that is not a DC coefficient, the scan mode information may be parsed from the bitstream. Here, last bit information indicating whether a DC coefficient is a last coefficient in the transformation coefficients may also be parsed from the bitstream.

A scan mode set may be determined according to slices, pictures, or sequences. When the scan mode set is parsed, the scan mode information may be parsed according to slices, pictures, or sequences.

The video decoding method may additionally perform a video decoding operation using a video decoding processor in order to restore a video through video decoding.

According to the video encoding method of FIG. 7, a scan mode is selectively determined based on characteristics of transformation coefficients and the transformation coefficients are output according to a scanning direction and an encoding order indicated by the scan mode, thereby reducing an output data amount of the transformation coefficients or outputting the transformation coefficients in a format that is easily compressed.

Also, according to the video decoding method of FIG. 8, a scan mode is selectively determined in order to decode transformation coefficients, and entire transformation coefficients of a transformation unit are inverse-transformed by arranging the transformation coefficients according to the determined scan mode, thereby correctly restoring pixel data of a spatial domain.

As described above, the video encoding apparatus 10 and the video encoding method described above with reference to FIGS. 1 and 7, and the video decoding apparatus 20 and the video decoding method described above with reference to FIGS. 2 and 8 selectively determine a scan mode for transformation coefficients of a predetermined transformation unit, such as a block.

Alternatively, the video encoding and decoding apparatuses 10 and 20 may selectively determine a scan mode of transformation coefficients generated based on coding units having a tree structure and having variable sizes and shapes, corresponding prediction units, and corresponding transformation units, and respectively encode and decode the transformation coefficients arranged according to the scan mode.

Alternatively, in order to encode a video based on coding units having a tree structure, the video encoding apparatus 10 may split an image of the video into at least one maximum coding unit. The video encoding apparatus 10 may determine the coding units having a tree structure, transformation units, and prediction units, for each maximum coding unit.

The video encoding apparatus 10 may perform prediction based on prediction units and partitions having sizes equal to or smaller than deeper coding units, according to the deeper coding units hierarchically configured according to depths indicating a number of times the maximum coding unit is spatially split, and may perform encoding including transformation based on transformation units. The video encoding apparatus 10 may select a coding unit having a coded depth to be output as an encoding result from among the deeper coding units. Accordingly, the coding units having the tree structure and coding units of coded depths are determined, and the prediction units (partitions) obtained by performing prediction on the coding units of coded depths and transformation units obtained by performing transformation on the coding units of coded depths may be determined.

The video encoding apparatus 10 may encode and output symbols including image data encoded based on coding units having a tree structure, and encoding information about coded depths and encoding modes of the coding units having a tree structure, according to each maximum coding unit.

The video encoding apparatus 10 may selectively determine a scan mode based on characteristics of transformation coefficients of a transformation unit. The transformation coefficients may be output according to a scanning direction and an encoding order indicated by the determined scan mode. Also, the video encoding apparatus 10 may further encode scan mode information as encoding information.

Coding units having a predetermined depth may be determined to be coding units having coded depths or split into coding units having lower depths without being determined to have coded depths, independently from spatially neighboring coding units. Accordingly, coding units having a tree structure may include coding units having coded depths that are hierarchical in a same region and are independent in different regions, in the maximum coding unit. Accordingly, a video may be encoded based on coding units, prediction units, and transformation units having spatially variably determined sizes and shapes.

The video decoding apparatus 20 may extract symbols including encoded data of a picture and encoding information about coded depths and encoding modes, from a bitstream according to coding units having a tree structure, for each maximum coding unit. The video decoding apparatus 20 may determine information about coded depths and encoding modes of coding units having a tree structure, transformation units, and prediction units, by using the encoding information, according to each maximum coding unit.

Alternatively, the video decoding apparatus 20 may decode encoded data based on transformation units and prediction units by using encoding information about coded depths and encoding modes, according to coding units having a tree structure.

The video decoding apparatus 20 may selectively determine a scan mode based on characteristics of transformation coefficients of a transformation unit. The video decoding apparatus 20 may form a transformation unit in which transformation coefficients are arranged according to a scanning direction and a decoding order indicated by the determined scan mode, and may perform inverse-transformation based on the transformation unit. Alternatively, the video decoding apparatus 20 may determine a scan mode of a transformation unit based on scan mode information when the scan mode information is parsed as encoding information.

Relationships between coding units having a tree structure that are bases of transformation units used in the video encoding and decoding apparatuses 10 and 20, prediction units, and transformation units will now be described with reference to FIGS. 9 through 23. Also, video encoding and decoding methods and apparatuses based on coding units having a tree structure and using a selective scan mode will be described with reference to FIGS. 9 through 23.

Figure 9:
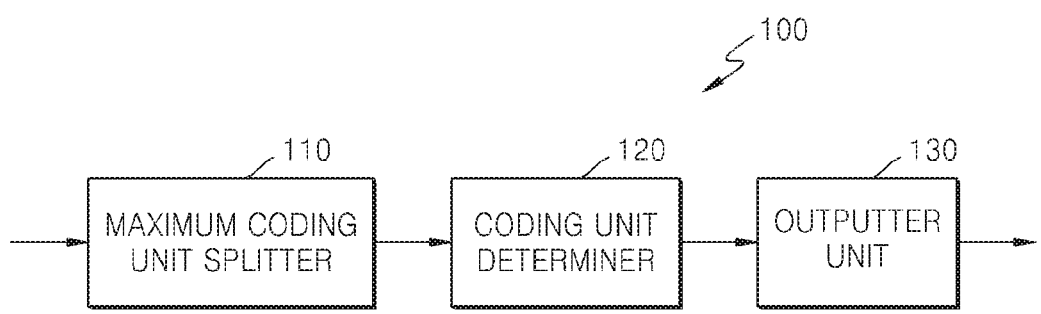
FIG. 9 is a block diagram of a video encoding apparatus based on coding units according to a tree structure, according to an exemplary embodiment.

FIG. 9 is a block diagram of a video encoding apparatus 100 based on coding units according to a tree structure, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition may be a data unit in which a prediction unit of a coding unit is split, and the prediction unit may be a partition having a same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is thus N×N, and may be 2 when the size of the transformation unit is thus N/2×N/2. In other words, the transformation units according to a tree structure may be set for the transformation units according to a transformation depth.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit, prediction units/partitions, and a method of determining a transformation unit, according to exemplary embodiments, will be described in detail below with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a SPS, or a PPS.

Also, information about a maximum size and a minimum size of the transformation unit allowed with respect to a current video may be output through a header of a bitstream, a SPS, or a PPS. The output unit 130 may encode and output reference information related to prediction, prediction information, uni-directional prediction information, and slice type information including a fourth slice type, which have been described above with reference to FIGS. 1 through 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 9 may perform operations of the video encoding apparatus 10 described above with reference to FIG. 1.

The coding unit determiner 120 may perform operations of the transformer 12, the scan mode determiner 14, and the transformation coefficient output unit 16 of the video encoding apparatus 10. In other words, transformation coefficients of the transformer 12, the scan mode determiner 14, and the transformation coefficient output unit 16 may be generated via transformation based on transformation units included in each coding unit, from among coding units having a hierarchical structure obtained by splitting a current image.

The coding unit determiner 120 may generate transformation coefficients by performing transformation based on transformation units according to depths and deeper coding units, until coded depths forming coding units having a tree structure in a maximum coding unit are all determined. If a size of a transformation unit is equal to or smaller than a size of a current coding unit, transformation units having various sizes may be used. Accordingly, transformation coefficients may be generated via transformation according to transformation units.

The coding unit determiner 120 may determine a scan mode of a transformation unit from among a plurality of scan modes based on characteristics of transformation coefficients of a current transformation unit. A scan mode may be determined as described above with reference to FIGS. 1 through 8. An optimum combination of a size of a transformation unit and a scan mode may be determined by attempting scan modes according to sizes of transformation units. The coding unit determiner 120 may determine a scan mode set according to sequences, pictures, slices, frames, or maximum coding units. Transformation coefficients that are encoded and output in quantized transformation units may be determined according to a scanning direction and an encoding order indicated by a scan mode determined by the coding unit determiner 120.

The coding unit determiner 120 may compare encoding results by using transformation coefficients output according to a scan mode selectively determined for a corresponding transformation unit, according to deeper coding units. Accordingly, as described above, a coded depth is determined by comparing encoding results of deeper coding units, and coding units having a tree structure and coded depths determined independently according to regions in a maximum coding unit may be determined.

The output unit 130 may output quantized transformation coefficients according a scanning direction and an encoding order indicated by a scan mode of a transformation unit, according to coding units having a tree structure included in each maximum coding unit.

The output unit 130 of the video encoding apparatus 100 may encode scan mode information as information about an encoding mode. When transformation units of coding units having a tree structure include transformation units whose scan mode is explicitly determined, the output unit 130 may encode scan mode information. As described above with reference to FIG. 5, the output unit 130 may encode scan mode information and last bit information.

Figure 10:
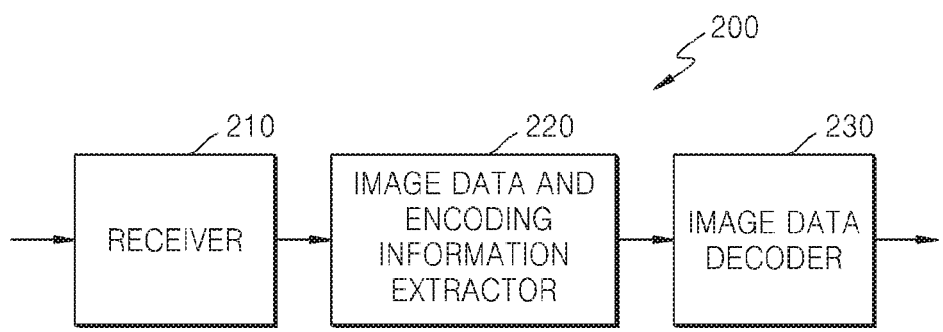
FIG. 10 is a block diagram of a video decoding apparatus based on coding units according to a tree structure, according to an exemplary embodiment.

FIG. 10 is a block diagram of a video decoding apparatus 200 based on coding units according to a tree structure, according to an exemplary embodiment.

The video decoding apparatus 200 includes a receiver 210, an image data and encoding information extractor 220, and an image data decoder 230.

Definitions of various terms, such as a coding unit, a depth, a prediction unit, a transformation unit, and information about various encoding modes, for various operations of the video decoding apparatus 200 are identical to those described with reference to FIG. 9 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 may restore the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation based on transformation units in the coding unit by reading information about the transformation units having a tree structure according to coding units, so as to perform the inverse transformation according to maximum coding units. A pixel value in a spatial domain of the coding unit may be reconstructed through the inverse transformation.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, information about the encoding mode may be obtained according to the coding units, and thus a current coding unit may be decoded.

The video decoding apparatus 200 of FIG. 10 may perform decoding operations of the video decoding apparatus 20 described above with reference to FIG. 2.

The receiver 210 and the image data and encoding information extractor 220 of the video decoding apparatus 200 may perform operations of the parser 22 of the video decoding apparatus 20.

The image data and encoding information extractor 220 may parse and extract a quantized transformation coefficient output according to a scan mode selectively determined according to an exemplary embodiment, according to coding units having a tree structure, from a parsed bitstream.

The image data decoder 230 of the video decoding apparatus 200 may perform operations of the scan mode determiner 24 and the inverse transformer 26 of the video decoding apparatus 20.

The image data decoder 230 may determine coding units having a tree structure and transformation units according to coding units, by using information about coded depths and encoding modes. The image data decoder 230 may determine a scan mode of transformation units from among a plurality of scan modes, based on characteristics of transformation coefficients of a current transformation unit. A scan mode may be determined as described above with reference to FIGS. 1 through 8.

The image data and encoding information 220 may parse a scan mode set from a bitstream. The image data decoder 230 may determine a scan mode set according to sequences, pictures, slices, frames, or maximum coding units by parsing the scan mode set. The image data decoder 230 may rearrange entire transformation coefficients of a transformation unit by arranging parsed and quantized transformation units in their locations and supplementing omitted '0' bits, according to a scanning direction and an encoding order indicated by the determined scan mode.

The image data and encoding information extractor 220 may extract scan mode information according to a transformation unit, as information about an encoding mode. The image data decoder 230 may rearrange entire transformation coefficients of a transformation unit by rearranging parsed and quantized transformation units by using a scan mode designated by reading the scan mode information.

The image data decoder 230 may restore a prediction error in a spatial domain by performing inverse quantization and inverse transformation on transformation units, according to coding units having a tree structure in a current image. The image data decoder 230 may restore pixel values of the image by performing intra prediction or motion compensation on a prediction error based on a prediction unit or partition, according to coding units, and performing a decoding process of deblocking filtering or in-loop filtering.

As such, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 11:
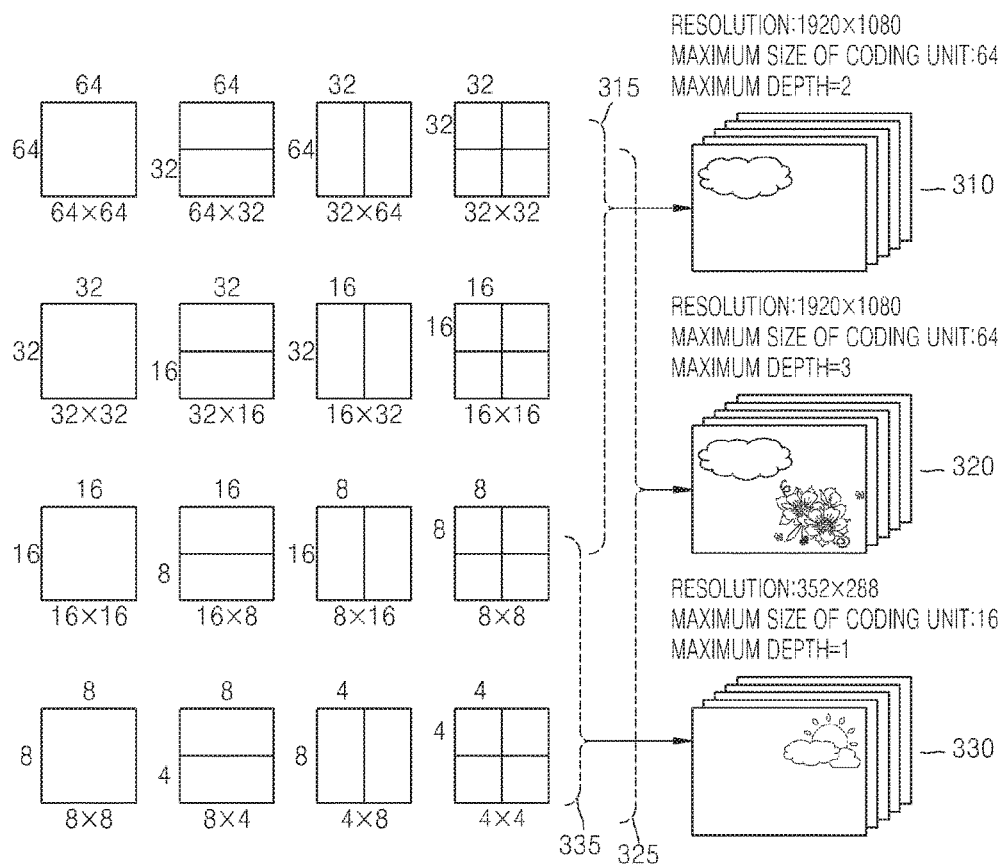
FIG. 11 is a diagram for describing a concept of coding units according to an exemplary embodiment.

FIG. 11 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 11 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 12:
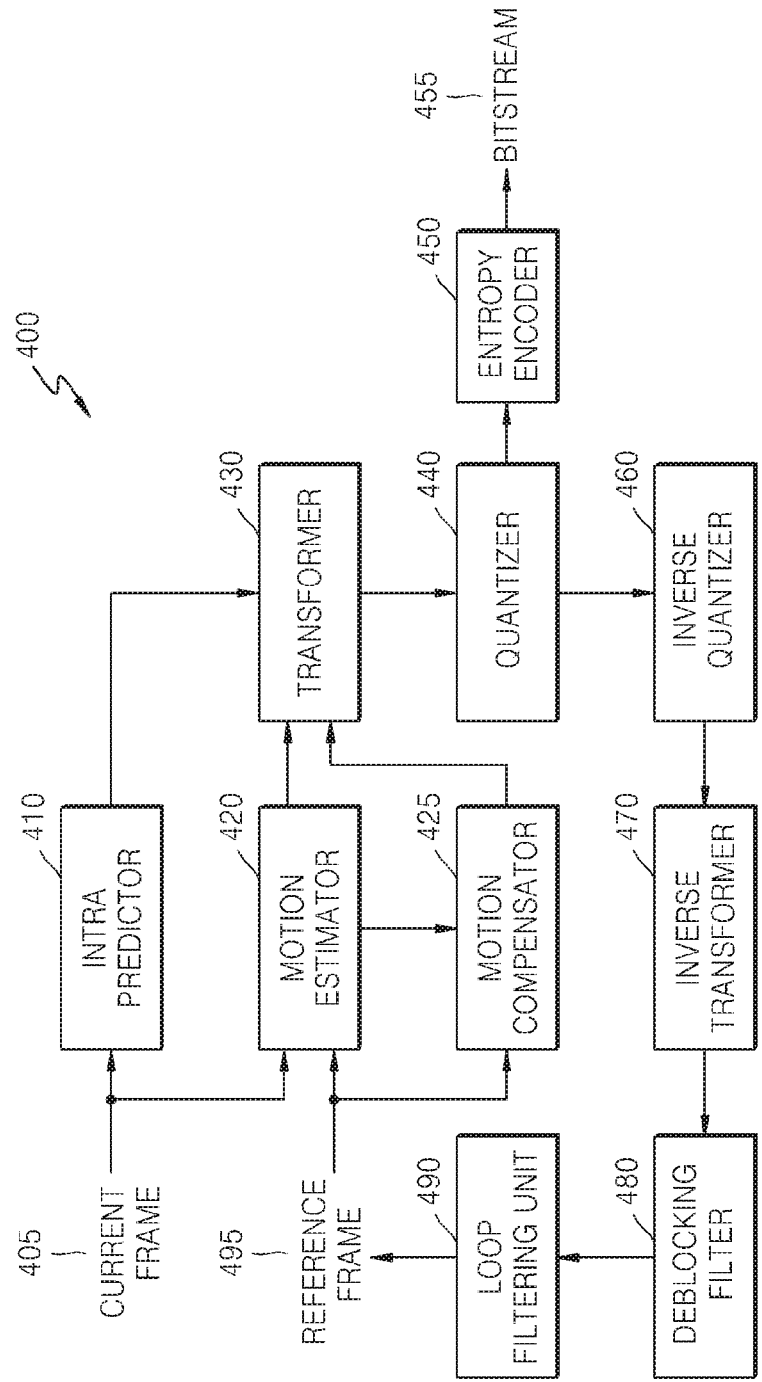
FIG. 12 is a block diagram of an image encoder based on coding units according to an exemplary embodiment.

FIG. 12 is a block diagram of an image encoder 400 based on coding units according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse quantizer 460 and an inverse transformer 470, and the reconstructed data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

The quantized transformation coefficients may be output according to transformation units from the quantizer 440 through the transformer 430. As described above with reference to FIGS. 1 through 10, the image encoder 400 may determine a scan mode based on characteristics of the quantized transformation coefficients, and determine a scanning direction and an encoding order of the quantized transformation coefficients output by the quantizer 440. The quantized transformation coefficients output according to the scanning direction and the encoding order may be input to the entropy encoder 450 and symbol-encoded.

Figure 13:
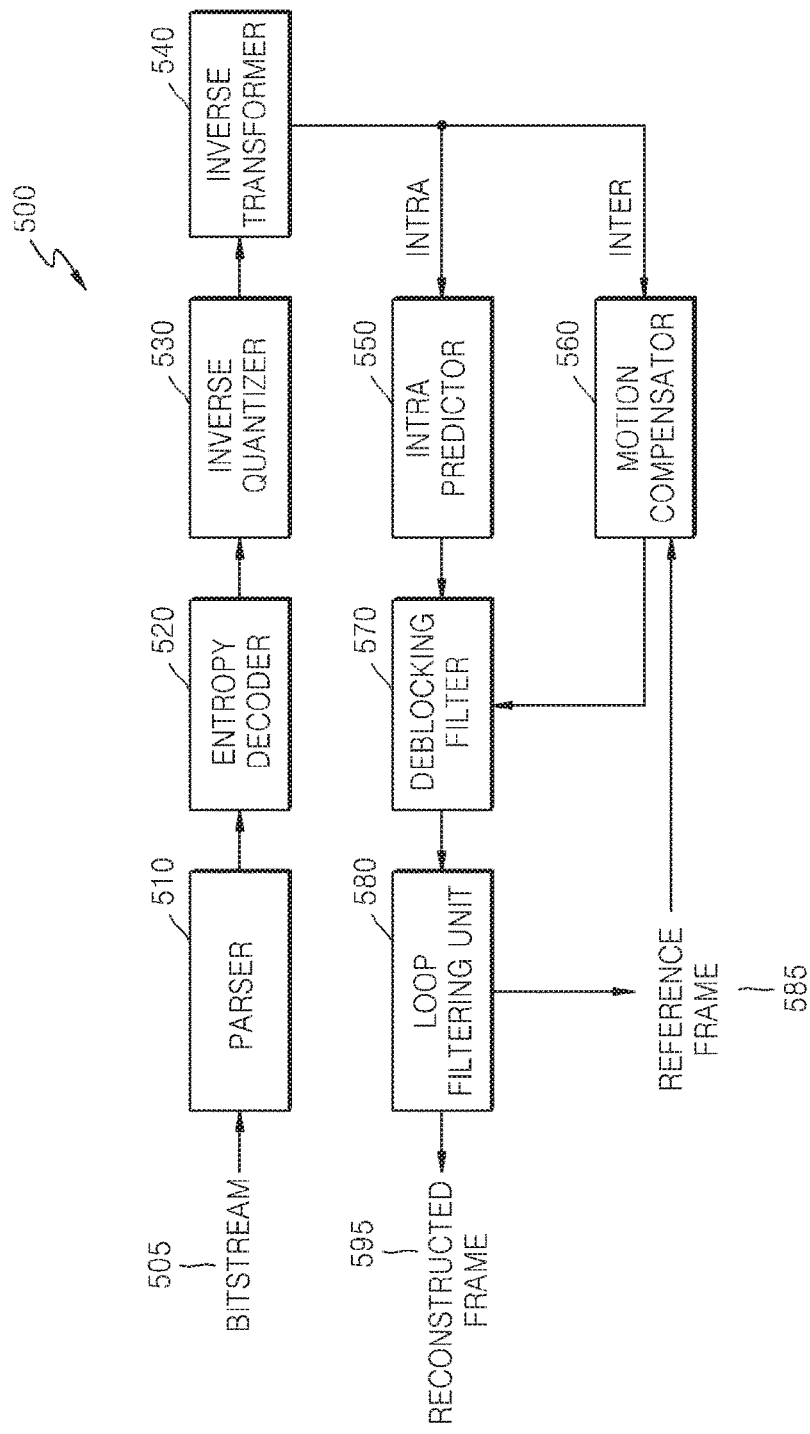
FIG. 13 is a block diagram of an image decoder based on coding units according to an exemplary embodiment.

FIG. 13 is a block diagram of an image decoder 500 based on coding units according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a reconstructed frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

The entropy decoder 520 extracts quantized transformation coefficients according to transformation units from a bitstream, through the parser 510. As described above with reference to FIGS. 1 through 10, the image decoder 500 may determine a scan mode based on characteristics of the quantized transformation coefficients, and determine a scanning direction and an arrangement order of the extracted quantized transformation coefficients. Quantized transformation coefficients of a transformation unit rearranged according to the scanning direction and the arrangement order may be input to the inverse transformer 540 through the inverse quantizer 530, and then inverse quantized and inverse transformed to be restored as a prediction error in a spatial domain.

Figure 14:
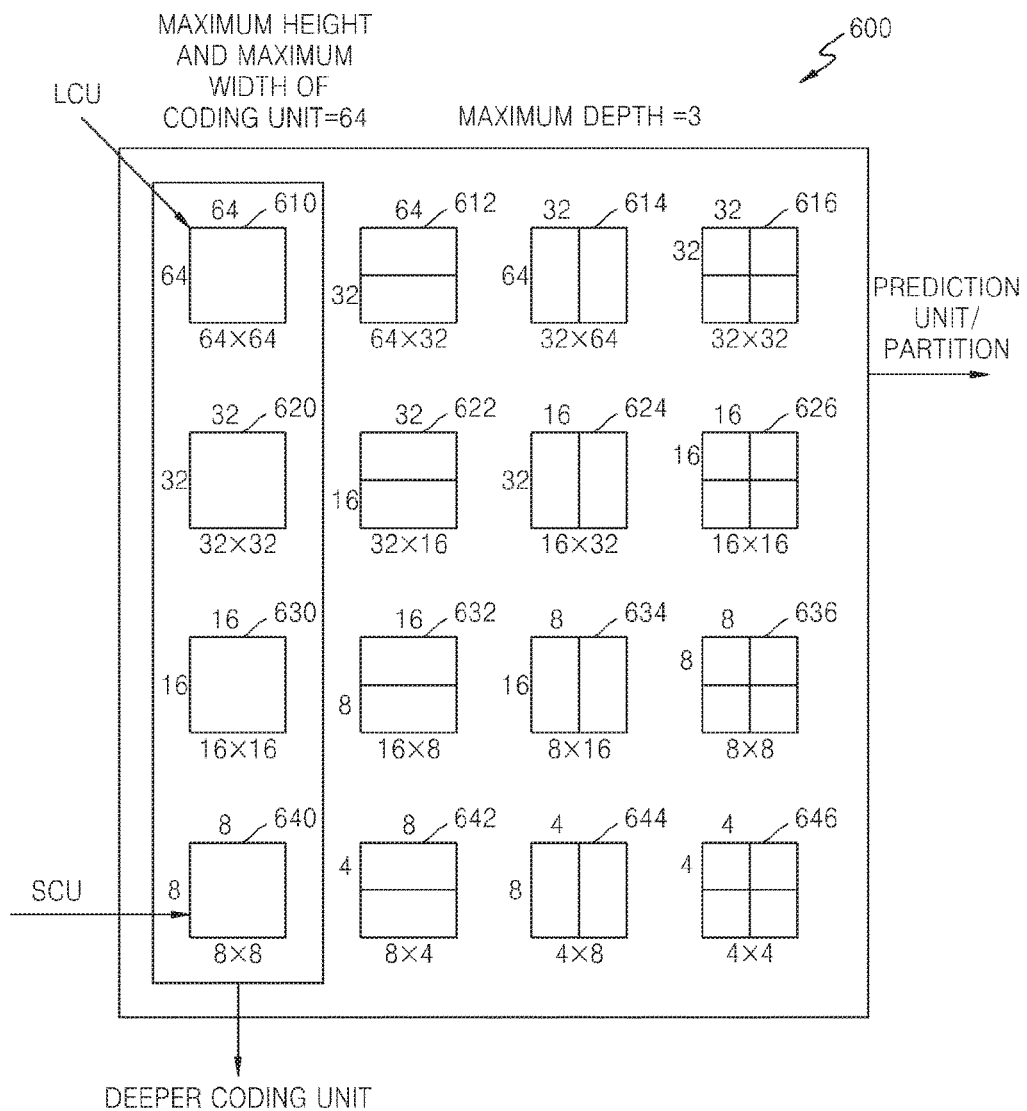
FIG. 14 is a diagram illustrating deeper coding units according to depths, and partitions according to an exemplary embodiment.

FIG. 14 is a diagram illustrating deeper coding units according to depths, and partitions according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. Here, the maximum depth denotes a total number of splits from a maximum coding unit to a minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 15:
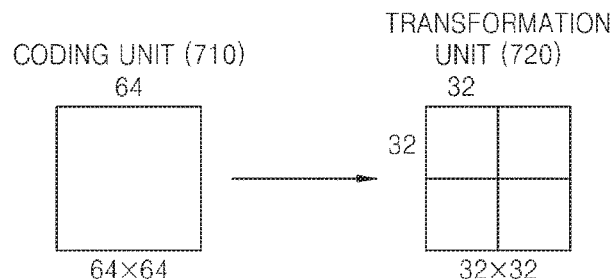
FIG. 15 is a diagram for describing a relationship between a coding unit and transformation units, according to an exemplary embodiment.

FIG. 15 is a diagram for describing a relationship between a coding unit 710 and transformation units 720, according to an exemplary embodiment.

The video encoding or decoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding or decoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 16:
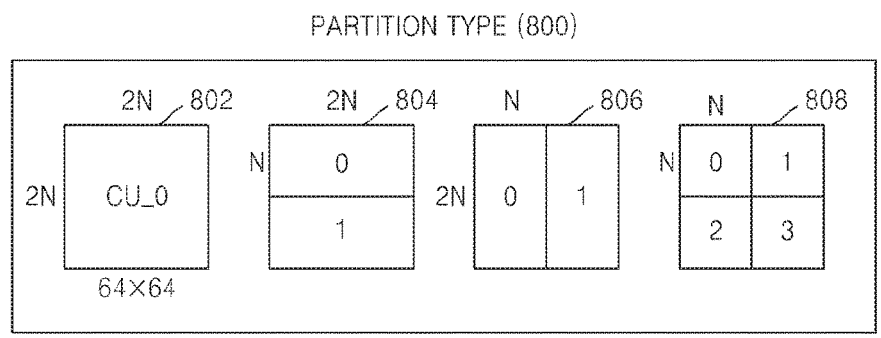
FIG. 16 is a diagram for describing encoding information of coding units corresponding to a coded depth, according to an exemplary embodiment.
Figure 16:
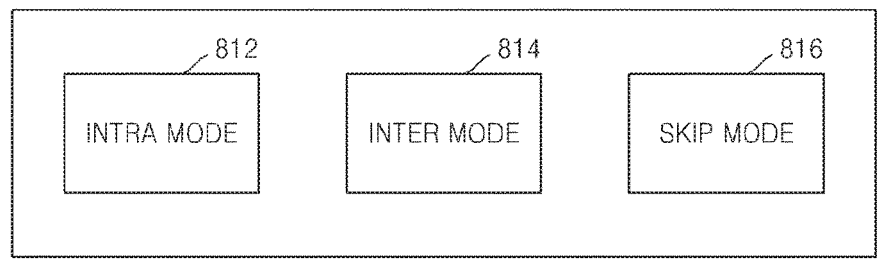
Figure 16:
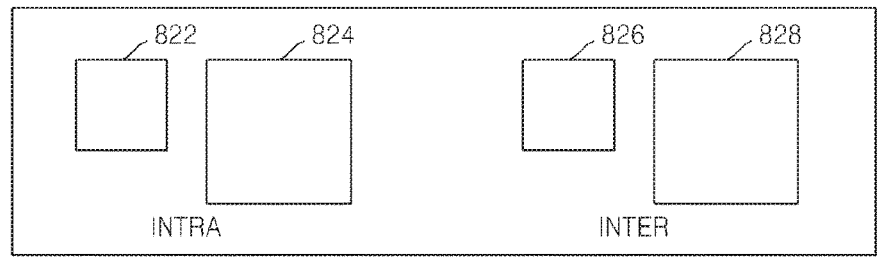

FIG. 16 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first intra transformation unit 826, or a second intra transformation unit 828.

Figure 17:
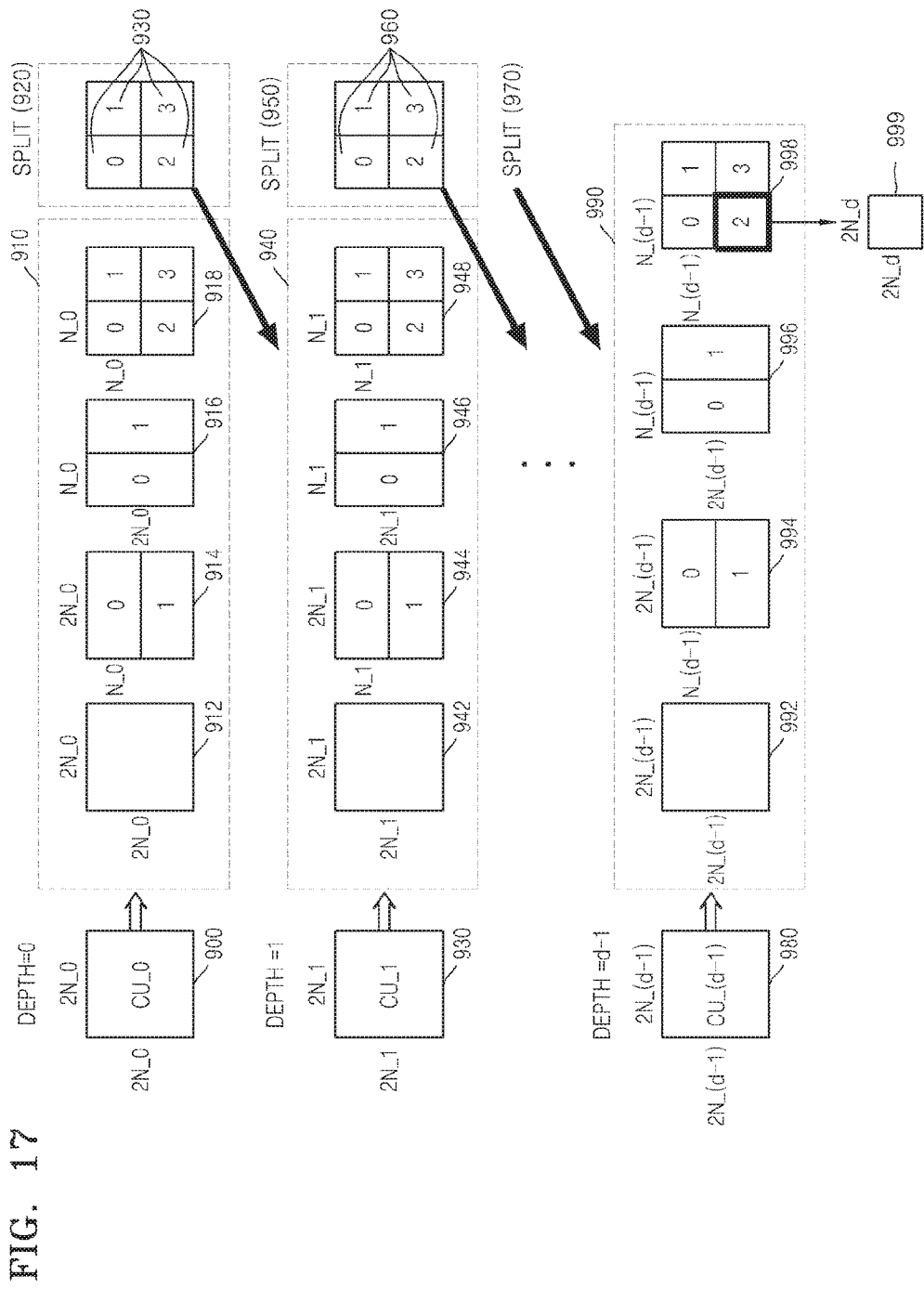
FIG. 17 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 17 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 15 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, deeper coding units may be set up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 18:
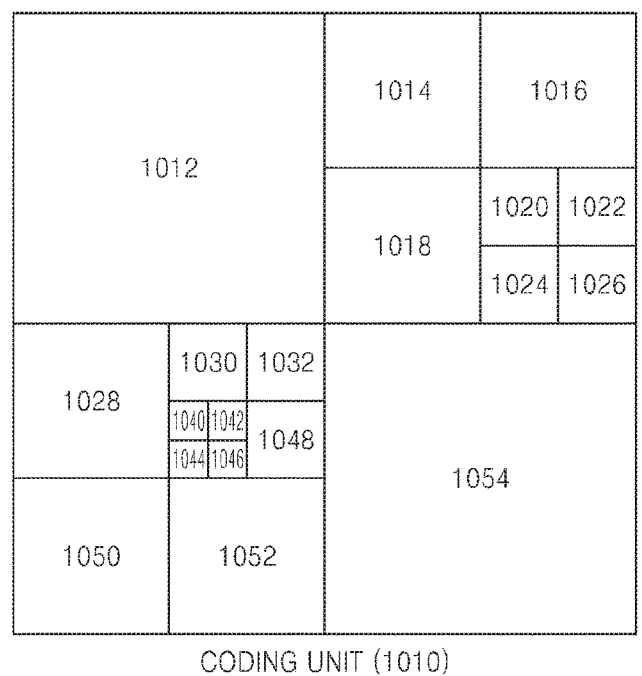
FIGS. 18 through 20 are diagrams for describing a relationship between coding units, prediction units, and transformation units, according to an exemplary embodiment.
Figure 19:
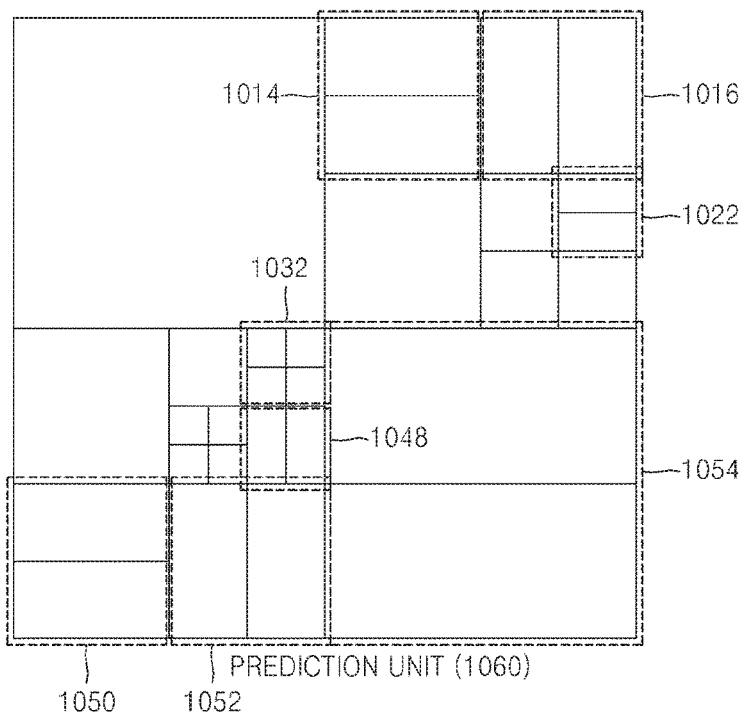
Figure 20:
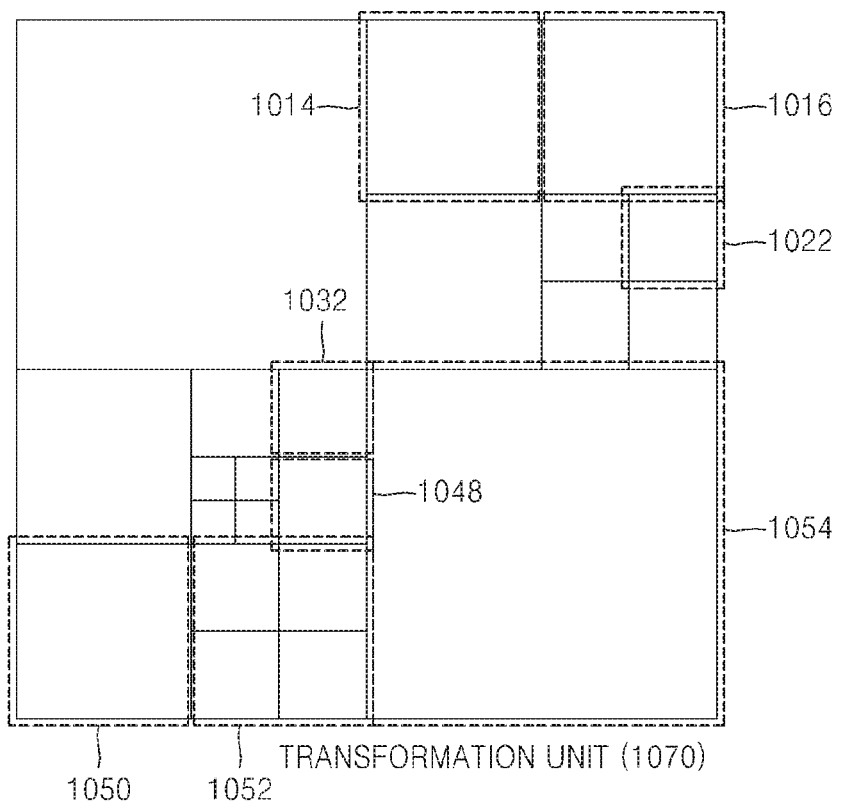

FIGS. 18 through 20 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether neighboring data units are included in the same coding unit corresponding to the coded depth by comparing encoding information of the neighboring data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of neighboring data units, encoding information of data units in deeper coding units adjacent to the current coding unit may be directly referred to and used.

Alternatively, if a current coding unit is predicted based on encoding information of neighboring data units, data units neighboring to the current coding unit are searched using encoded information of the data units, and the searched neighboring coding units may be referred for inter predicting the current coding unit.

Figure 21:
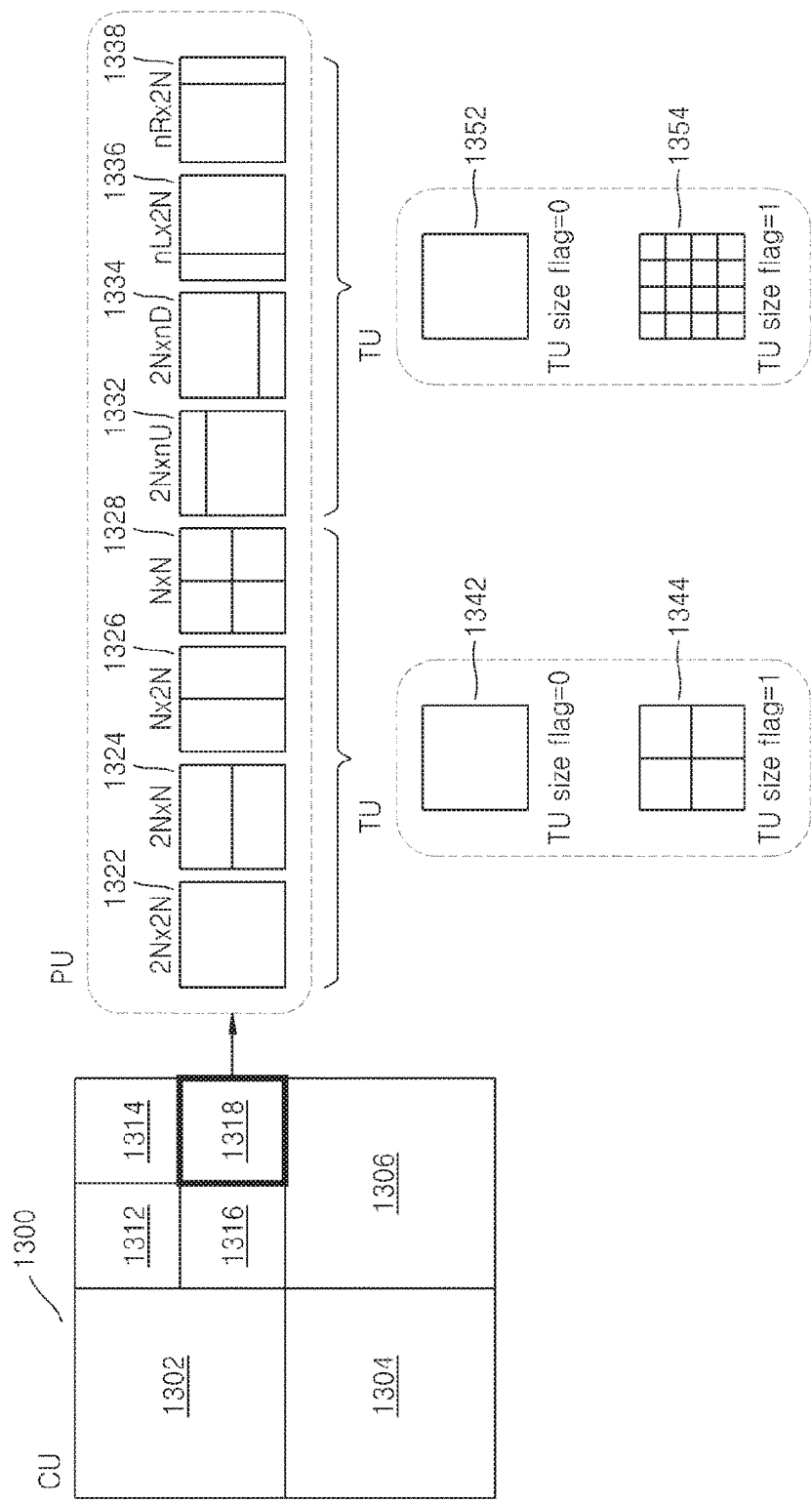
FIG. 21 is a diagram for describing a relationship between a coding unit, a prediction unit, and a transformation unit, according to encoding mode information of Table 1.

FIG. 21 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index, and a size of a transformation unit corresponding to a transformation index may vary according to a type of a prediction unit or partition of a coding unit.

For example, when the partition type is set to be symmetrical, i.e., the partition type 1322, 1324, 1326, or 1328, a transformation unit 1342 having a size of 2N×2N is set if split information of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 21, the TU size flag is a flag having a value or 0 or 1, but the TU size flag is not limited to 1 bit, and a transformation unit may be hierarchically split having a tree structure while the TU size flag increases from 0. The TU size flag may be used as an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

CurrMinTuSize=max(MinTransformSize,RootTuSize/(2^MaxTransformSizeIndex)) (1)

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

RootTuSize=min(MaxTransformSize,PUSize) (2)

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

RootTuSize=min(MaxTransformSize,PartitionSize) (3)

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and one or more other exemplary embodiments are not limited thereto.

Figure 22:
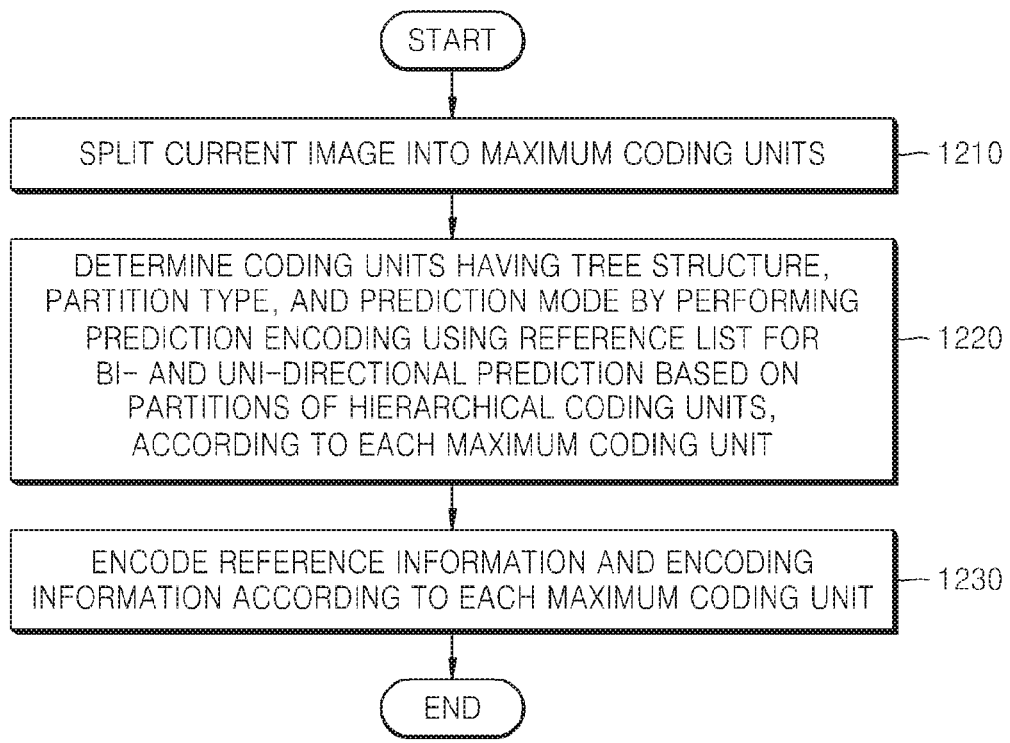
FIG. 22 is a flowchart illustrating a video encoding method based on coding units according to a tree structure, according to an exemplary embodiment.

FIG. 22 is a flowchart illustrating a video encoding method based on coding units according to a tree structure, according to an exemplary embodiment.

In operation 1210, a current image is split into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from neighboring coding units. Encoding is repeatedly performed on each coding unit according to depths.

Also, a prediction unit, a partition, and a transformation unit, which have the least encoding error, are determined according to deeper coding units. Intra prediction or inter prediction may be performed according to coding units, and a partition type and a prediction mode may be determined to reduce an encoding error. Also, transformation and quantization may be performed on a prediction error generated via intra prediction or inter prediction, according to transformation units having various sizes, so as to determine a size of a transformation unit for reducing an encoding error.

Finally, a coding unit having a coded depth, a corresponding prediction mode, a partition type, and a size of a transformation unit may be determined based on measuring and comparing encoding errors generated according to coding units of all depths, all prediction units and partitions, and transformation units having all sizes.

While determining the coding units, a scan mode indicating a scanning direction and an encoding order of quantized transformation coefficients of a transformation unit may be determined. Various can modes may be attempted according to sizes of transformation units so as to determine an optimum combination of a size of a transformation unit and a scan mode. A scan mode of a current transformation unit may be determined based on an encoding mode of the current transformation unit, a scan mode of a neighboring transformation unit, or an encoding mode or scan mode of another color component.

In operation 1230, image data constituting the final encoding result according to at least one split region is output for each maximum coding unit, with information about the coded depth and an encoding mode. In particular, transformation coefficients encoded and output from among quantized transformation units of a transformation unit may be determined according to the scanning direction and the encoding order indicated by the scan mode determined in operation 1220.

Only quantized transformation coefficients to be encoded according to a scanning direction and an encoding order indicated by a scan mode of a transformation unit may be output according to coding units having a tree structure in a maximum coding unit.

When a scan mode of a transformation unit is explicitly determined, scan mode information may be encoded as information about an encoding mode. Scan mode information and last bit information may be encoded together.

The encoded information about the encoding mode may be transmitted to a decoding unit along with the encoded image data.

Figure 23:
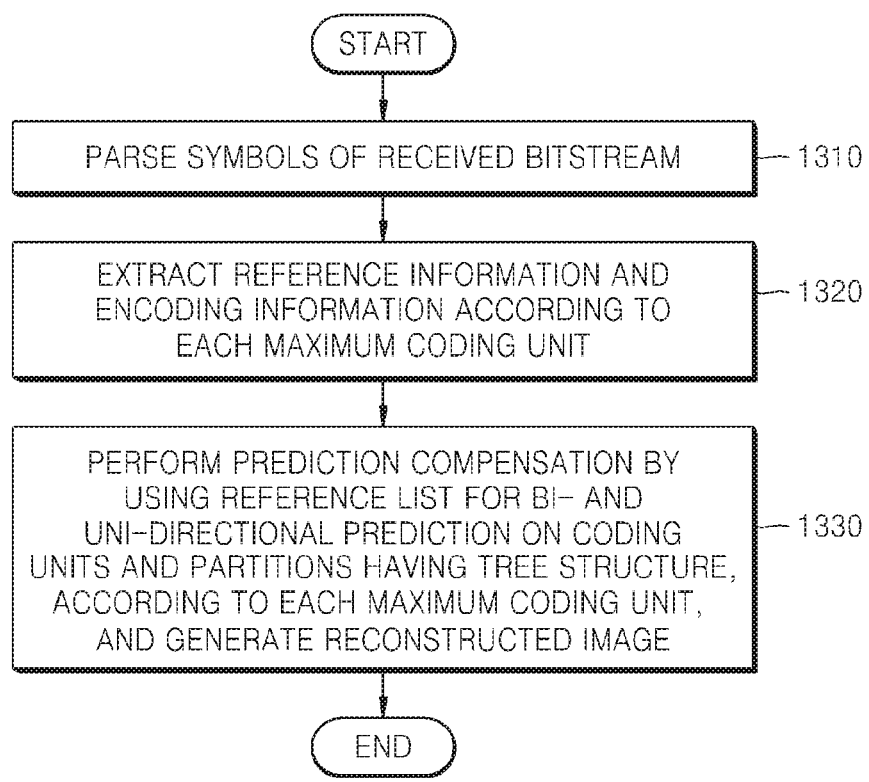
FIG. 23 is a flowchart illustrating a video decoding method based on coding units according to a tree structure, according to an exemplary embodiment.

FIG. 23 is a flowchart illustrating a video decoding method based on coding units according to a tree structure, according to an exemplary embodiment.

In operation 1310, a bitstream of an encoded video is received and parsed.

In operation 1320, encoded image data of a current picture assigned to a maximum coding unit, and information about a coded depth and an encoding mode according to maximum coding units are extracted from the parsed bitstream. The coded depth of each maximum coding unit is a depth having the least encoding error in each maximum coding unit. A symbol of the encoded image data is parsed based on at least one data unit obtained by hierarchically splitting the each maximum coding unit according to depths.

According to the information about the coded depth and the encoding mode, the maximum coding unit may be split into coding units having a tree structure. Each of the coding units having the tree structure is determined as a coding unit corresponding a coded depth, and is optimally encoded as to output the least encoding error. Accordingly, encoding and decoding efficiency of an image may be improved by decoding each piece of encoded image data in the coding units after determining at least one coded depth according to coding units.

In operation 1330, decoding may be performed by using the information about the coded depth and the encoding mode, for each maximum coding unit. Coding units having a tree structure may be determined in a maximum coding unit, and transformation units may be determined according to coding units.

A scan mode of a transformation unit may be determined from among a plurality of scan modes, based on characteristics of transformation coefficients of a current transformation unit. The scan mode of the current transformation unit may be determined based on an encoding mode of the current transformation unit, a scan mode of a neighboring transformation unit, or an encoding mode or scan mode of another color component. A scan mode set may be parsed from the bitstream. An optimum scan mode for the current transformation unit may be determined from among the scan mode set that is set according to sequences, pictures, slices, frames, or maximum coding units.

Scan mode information of a transformation unit may be parsed as information about an encoding mode. Parsed and quantized transformation units may be rearranged and thus entire transformation coefficients of the current transformation unit may be rearranged, according to a scan mode indicated by the scan mode information.

The parsed and quantized transformation units are rearranged according to the scanning direction and the encoding order indicated by the scan mode, and omitted '0' bits are supplemented so as to perform inverse quantization and inverse transformation on entire transformation coefficients of the transformation units that have been rearranged.

In operation 1330, decoding operations, such as inverse quantization, inverse transformation, intra prediction, and motion compensation, are performed on each maximum coding unit based on the information about the coded depth and the encoding mode, according to each maximum coding unit. Intra prediction or motion compensation may be performed as a prediction unit or partition is determined based on partition type information, and a prediction mode is determined according to prediction units or partitions based on prediction mode information, wherein the partition type information and the prediction mode information are included in the information about the coded depths and encoding mode.

Image data in a spatial domain may be reconstructed as decoding is performed according to coding units in maximum coding units, and a picture and a video that is a picture sequence may be reconstructed. The reconstructed video may be reproduced by a reproducing apparatus, stored in a storage medium, or transmitted through a network.

One or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, it is understood that in exemplary embodiments, one or more units of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the inventive concept as defined by the appended claims. Exemplary embodiments should be considered in descriptive sense only and not for purposes of limitation. Therefore, the scope of the inventive concept is defined not by the detailed description of exemplary embodiments but by the appended claims, and all differences within the scope will be construed as being included in the present invention.

The invention claimed is:

1. An apparatus for video decoding, the apparatus comprising at least one processor configured to:
   determine a transformation unit included in a coding unit split from an image;
   determine a luma component scan mode of the transformation unit from among a plurality of scan modes based on a luma component intra prediction mode and a size of the transformation unit;

obtain a luma component significant coefficient of the transformation unit according to the luma component scan mode;
determine a chroma component scan mode of the transformation unit from among the plurality of scan modes based on a chroma component intra prediction mode and a size of the transformation unit;
obtain a chroma component significant coefficient of the transformation unit according to the chroma component scan mode;
inverse-transform a luma component of the transformation unit based on the luma component significant coefficient; and
inverse-transform a chroma component of the transformation unit based on the chroma component significant coefficient,
wherein the plurality of the scan modes include a horizontal direction scan mode and a vertical direction scan mode.

2. The apparatus of claim 1, wherein a level of the luma component significant coefficient and a level of the chroma component significant coefficient are non-zero.

* * * * *